United States Patent
Warden et al.

(10) Patent No.: US 10,843,350 B2
(45) Date of Patent: Nov. 24, 2020

(54) COUNTERBALANCED SUPPORT SYSTEM AND METHOD OF USE

(71) Applicant: Brunson Instrument Company, Kansas City, MO (US)

(72) Inventors: Adam Warden, Lee's Summit, MO (US); Mark Meuret, Overland Park, KS (US); Isaac Gipson, Lee's Summit, MO (US); Aaron Hudlemeyer, Jemez Springs, NM (US); Deighton Brunson, Lee's Summit, MO (US)

(73) Assignee: Brunson Instrument Company, Kansas City, MO (US)

( * ) Notice: Subject to any disclaimer, the term of this patent is extended or adjusted under 35 U.S.C. 154(b) by 243 days.

(21) Appl. No.: 15/887,674

(22) Filed: Feb. 2, 2018

(65) Prior Publication Data
US 2018/0215052 A1    Aug. 2, 2018

Related U.S. Application Data

(60) Provisional application No. 62/453,607, filed on Feb. 2, 2017.

(51) Int. Cl.
*F16M 11/12* (2006.01)
*B25J 19/00* (2006.01)
(Continued)

(52) U.S. Cl.
CPC .............. *B25J 19/002* (2013.01); *B25J 9/102* (2013.01); *F16M 11/10* (2013.01);
(Continued)

(58) Field of Classification Search
CPC ......... B25J 19/002; B25J 9/102; F16M 11/10; F16M 11/2042; F16M 2200/04; Y10S 901/14; Y10S 901/15; Y10S 901/16
(Continued)

(56) References Cited

U.S. PATENT DOCUMENTS

| | | | |
|---|---|---|---|
| 4,166,602 A * | 9/1979 | Nilsen ................... | A61B 6/447 248/280.11 |
| 5,651,718 A * | 7/1997 | Nakamura ............. | A61B 90/25 248/123.2 |

(Continued)

FOREIGN PATENT DOCUMENTS

WO     2018144913 A1    8/2018

OTHER PUBLICATIONS

International Search Report and Written Opinion for PCT/US2018/016700; dated May 15, 2018.

*Primary Examiner* — Nkeisha Smith
(74) *Attorney, Agent, or Firm* — Kutak Rock LLP

(57) ABSTRACT

An arm assembly and hand assembly for supporting metrology equipment is provided. The hand assembly includes a boom arm having a proximal end coupled to a distal end of the arm assembly and a distal end coupled to a carriage assembly of the hand assembly. The carriage assembly is configured to support the metrology equipment in such a way so as to align the center of gravity of the metrology equipment substantially at the center of rotation of the hand assembly. The arm assembly includes an upper arm that is supported by way of a first counterbalance mechanism and/or a first brake mechanism and a forearm extending from a distal end of the upper arm, the forearm being supported by a second counterbalance mechanism and/or a second brake mechanism by way of a drive assembly. A hub assembly associated with a counterbalance mechanism includes an adjustment mechanism.

11 Claims, 17 Drawing Sheets

(51) Int. Cl.
*B25J 9/10* (2006.01)
*F16M 11/10* (2006.01)
*F16M 11/20* (2006.01)

(52) U.S. Cl.
CPC ..... *F16M 11/2042* (2013.01); *F16M 2200/04* (2013.01); *Y10S 901/14* (2013.01); *Y10S 901/15* (2013.01); *Y10S 901/16* (2013.01)

(58) Field of Classification Search
USPC ............... 248/123.11, 280.11, 292.11, 277.1, 248/917–923, 276.1
See application file for complete search history.

(56) References Cited

U.S. PATENT DOCUMENTS

| | | | | |
|---|---|---|---|---|
| 5,713,545 | A * | 2/1998 | Nakamura | F16M 11/126 248/123.2 |
| 6,050,530 | A * | 4/2000 | Nakamura | A61B 50/28 248/123.2 |
| 6,543,914 | B2 * | 4/2003 | Sander | F16M 11/08 362/401 |
| 6,592,086 | B1 * | 7/2003 | Sander | G02B 7/001 248/123.11 |
| 7,207,537 | B2 * | 4/2007 | Hung | F16M 11/10 248/274.1 |
| 7,364,127 | B2 * | 4/2008 | Huang | F16M 11/10 248/276.1 |
| 8,006,850 | B2 * | 8/2011 | Rotheisler | B66C 23/14 212/196 |
| 8,256,729 | B2 * | 9/2012 | Koch | F16M 11/2092 248/292.11 |
| 8,342,467 | B2 * | 1/2013 | Stachowski | A61B 8/00 248/280.11 |
| 8,925,885 | B2 * | 1/2015 | Ishii | H01M 10/44 248/280.11 |
| 9,033,292 | B2 * | 5/2015 | Lu | F16M 13/022 248/123.11 |
| 9,133,975 | B2 * | 9/2015 | Kelch | A61B 5/742 |
| 9,706,843 | B2 * | 7/2017 | Hung | F16M 11/105 |
| 10,039,508 | B2 * | 8/2018 | Abramovich | A61B 6/4476 |
| 2008/0308688 | A1 * | 12/2008 | Dillard | A61B 90/50 248/123.11 |
| 2008/0316368 | A1 | 12/2008 | Fritsch et al. | |
| 2009/0002548 | A1 | 1/2009 | Liang et al. | |
| 2009/0179129 | A1 | 7/2009 | Pettey | |
| 2010/0193457 | A1 | 8/2010 | Rotheisler | |
| 2012/0230668 | A1 * | 9/2012 | Vogt | G03B 17/561 396/428 |
| 2015/0136926 | A1 * | 5/2015 | Kuo | A61B 90/50 248/280.11 |
| 2018/0085915 | A1 * | 3/2018 | Hirose | G05B 1/00 |
| 2018/0112820 | A1 * | 4/2018 | Lau | F16M 13/022 |

* cited by examiner

COUNTERBALANCED SUPPORT SYSTEM AND METHOD OF USE

CROSS-REFERENCE TO RELATED APPLICATIONS

This application claims priority pursuant to 35 U.S.C. 119(e) to U.S. Provisional Patent Application Ser. No. 62/453,607, filed Feb. 2, 2017, the entire disclosure of which is incorporated herein by reference.

FIELD OF THE INVENTION

The present invention relates generally to a counterbalanced mechanical support assembly. More specifically, the present invention is concerned with an advanced counterbalanced support arm for use with metrology equipment.

BACKGROUND

Counterbalanced mechanical support arms of the prior art are configured to support relatively light loads and are not typically required to provide precise location capability. Consequently, many such counterbalanced mechanical support arms utilize standard mechanical configurations, such as standard spring-loaded configurations. As loading is increased and/or location precision becomes more important, however, such standard configurations are not adequate. Consequently, it would be beneficial to have a hand assembly and support arm system that is designed for holding metrology equipment while enabling precise location and orientation of the metrology equipment. Furthermore, it would be beneficial if the hand assembly was configured to provide rotation of the equipment that is substantially about a center of gravity of the equipment, thereby increasing the ability of a user to position and orient the equipment. Furthermore still, it would be beneficial if the arm assembly was capable of providing substantially constant load reactions for countering loads associated with the user positioning and/or orienting the equipment.

SUMMARY

The present invention comprises a support system having a hand assembly for holding metrology equipment and an arm assembly for supporting the hand assembly. The arm assembly includes a forearm extending between the hand assembly and an elbow assembly and an upper arm extending between the elbow assembly and a shoulder assembly. In some embodiments, the shoulder assembly is pivotally coupled to a base such that the base provides vertical and lateral support for the arm assembly. In this way, the upper arm is moveable between a lowered configuration and a raised configuration while the forearm is movable between a retracted configuration and an extended configuration, thereby providing a wide range of motion for positioning the hand assembly.

In some embodiments, one or more counterbalance is configured to bias the upper arm towards the raised configuration. In other embodiments, one or more counterbalance is configured to bias the forearm towards the extended configuration. In still other embodiments, one or more locking mechanism is configured to prevent or otherwise inhibit the upper arm and/or the forearm from moving from its current configuration. In some embodiments, the base is secured to a pivot assembly, thereby providing additional versatility for positioning the hand assembly.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
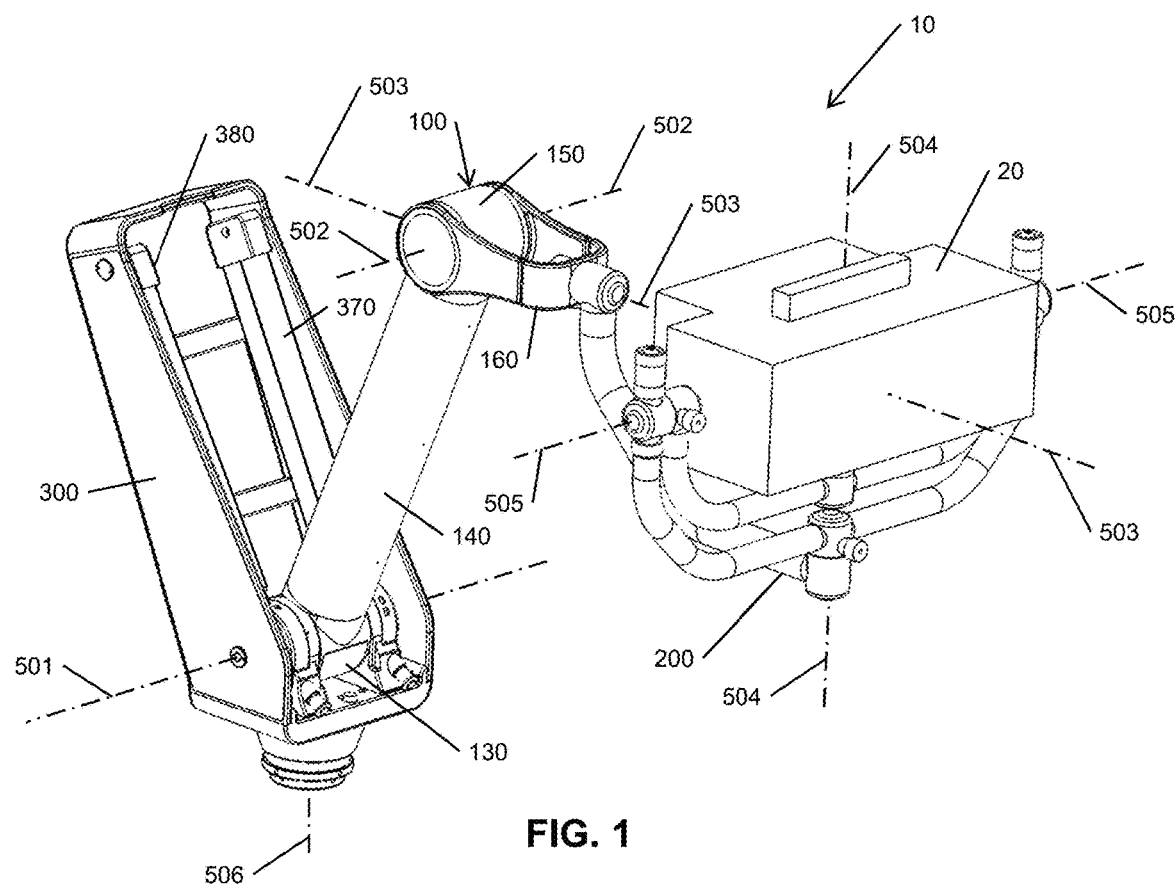
FIG. 1 is a perspective view of an embodiment of the present invention holding an object.
Figure 1A:
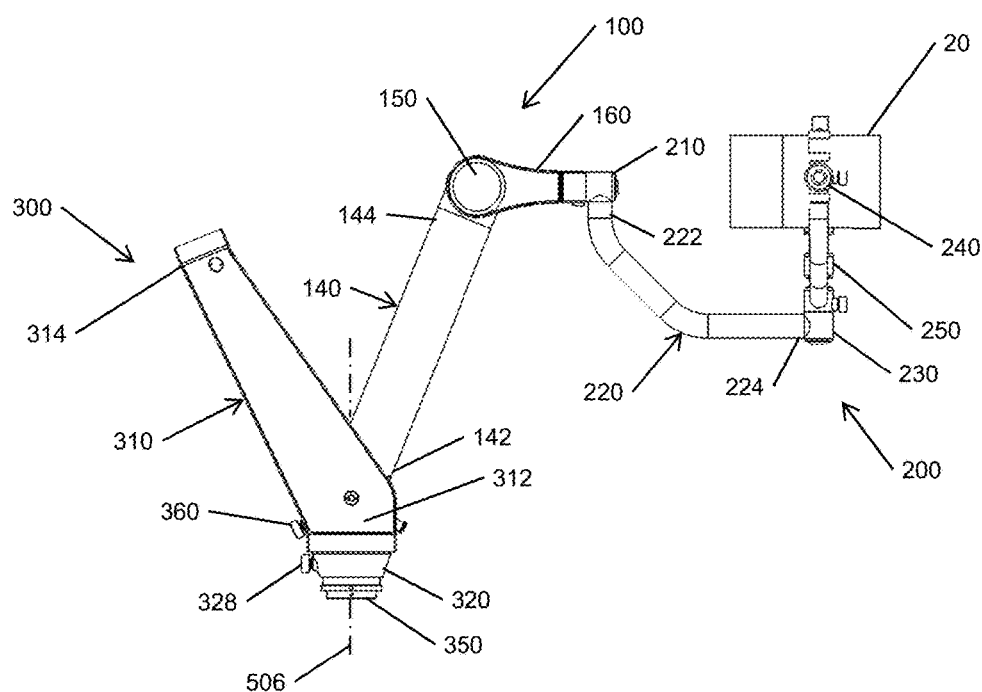
FIG. 1A is a side view of the embodiment of FIG. 1.
Figure 1B:
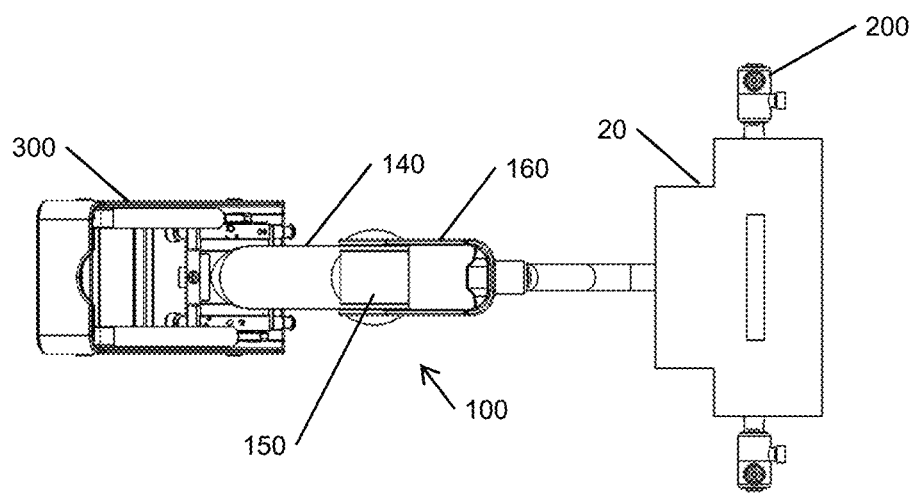
FIG. 1B is a top view of the embodiment of FIG. 1.
Figure 1C:
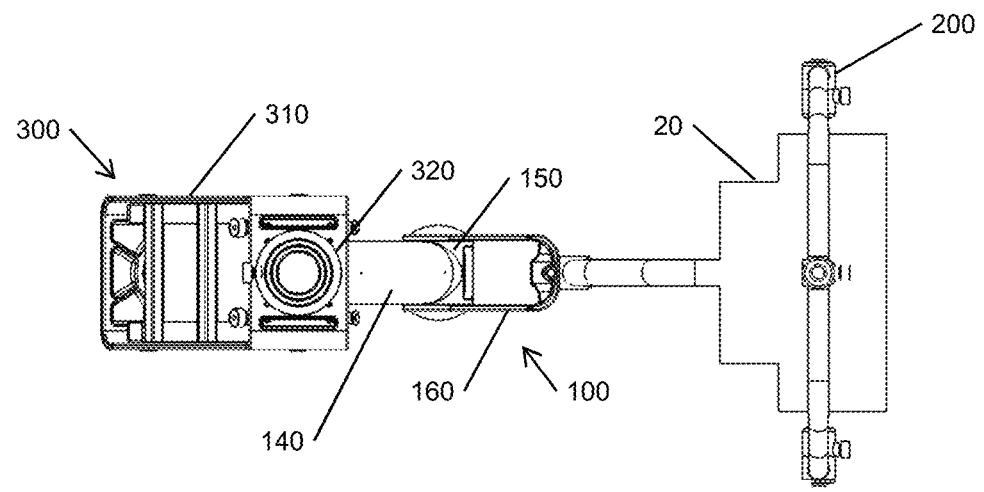
FIG. 1C is a bottom view of the embodiment of FIG. 1.

Referring to FIGS. 1 and 1A, the present invention comprises a support system 10 having a hand assembly 200 for holding an object 20, such as metrology equipment or the like (an "object") and an arm assembly 100 for supporting the hand assembly 200. The arm assembly 100 includes a forearm 160 extending between the hand assembly 200 and an elbow assembly 150 and an upper arm 140 extending between the elbow assembly 150 and a shoulder assembly 130. In some embodiments, the shoulder assembly 130 of the arm assembly 100 is pivotally coupled to a support assembly 300 of the support system 10 such that the support assembly 300 provides vertical and lateral support for the arm assembly 100. In some embodiments, the upper arm 140 and the forearm are rotatable about respective first 501 and second 502 axes. In this way, the upper arm 140 is moveable between a lowered configuration and a raised configuration while the forearm 160 is movable between a retracted configuration and an extended configuration, thereby providing a wide range of motion for positioning the hand assembly 200.

Still referring to FIGS. 1 and 1A, some embodiments of the hand assembly 200 are rotatably coupled to a distal end of the forearm 160 such that the hand assembly is capable of rotating about a third axis 503. In some embodiments, the third axis 503 is perpendicular to the second axis 502. In some embodiments, the hand assembly 200 includes a carriage assembly 250 and a boom arm 220 extending between the arm assembly 100 and the carriage assembly 250 so as to provide vertical and lateral support to the carriage assembly 250. In some embodiments, the carriage assembly 250 is rotatably coupled to the boom arm 220 such that the carriage assembly 250 is capable of rotating about a fourth axis 504. In some embodiments, the fourth axis 504 is perpendicular to the third axis 503.

In some embodiments, the carriage assembly 250 includes an inner carriage support 254 rotatably coupled to an outer carriage support 252. In some embodiments, the outer carriage support 252 extends between the inner carriage support 254 and the boom arm 220 so as to provide vertical and lateral support to the inner carriage support 254. In some embodiments, the inner carriage support 254 is rotatably coupled to the outer carriage support 252 such that the inner carriage support 254 is capable of rotating about a fifth axis 505. In some embodiments, the fifth axis 505 is perpendicular to the fourth axis 504.

In some embodiments, a first counterbalance assembly 370 is configured to bias the upper arm 140 towards the raised or lowered configuration. In other embodiments, a second counterbalance assembly 380 is configured to bias the forearm 160 towards the extended or retracted configuration. In still other embodiments, one or more locking mechanism, such as one or more brake assembly, safety button, or the like, is configured to prevent or otherwise inhibit the upper arm 140 and/or the forearm 160 from moving from its current configuration. In some embodiments, the shoulder assembly 130 is positioned at or near a proximal end 312 of a base 310 of the support assembly 300. In some such embodiments, the first 370 and second 380 counterbalance assemblies each extend from the shoulder assembly 130 towards a distal end 314 of the base 310.

Figure 1D:
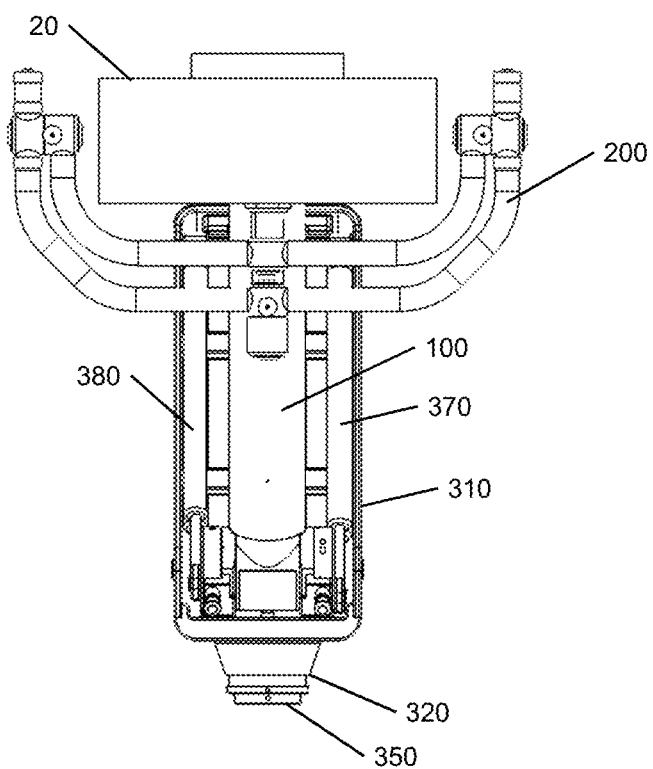
FIG. 1D is a front view of the embodiment of FIG. 1.
Figure 1E:
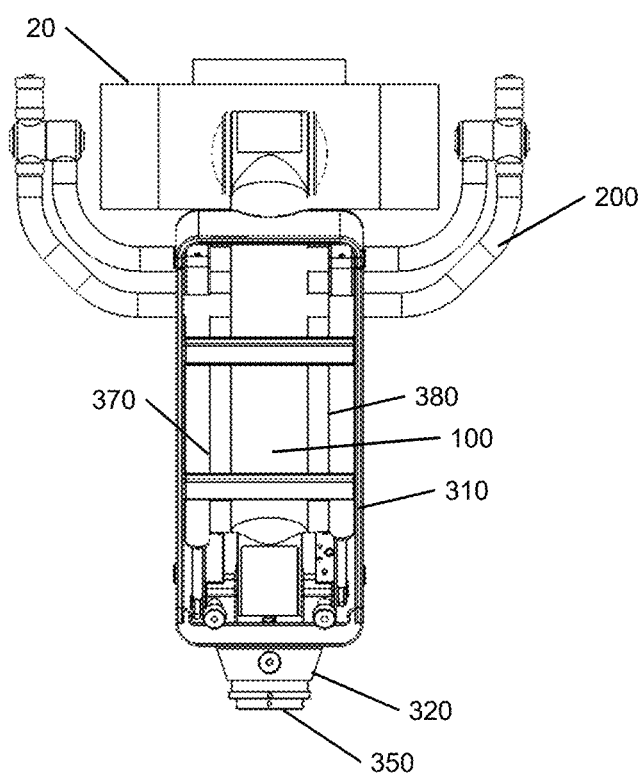
FIG. 1E is a rear view of the embodiment of FIG. 1.
Figure 2:
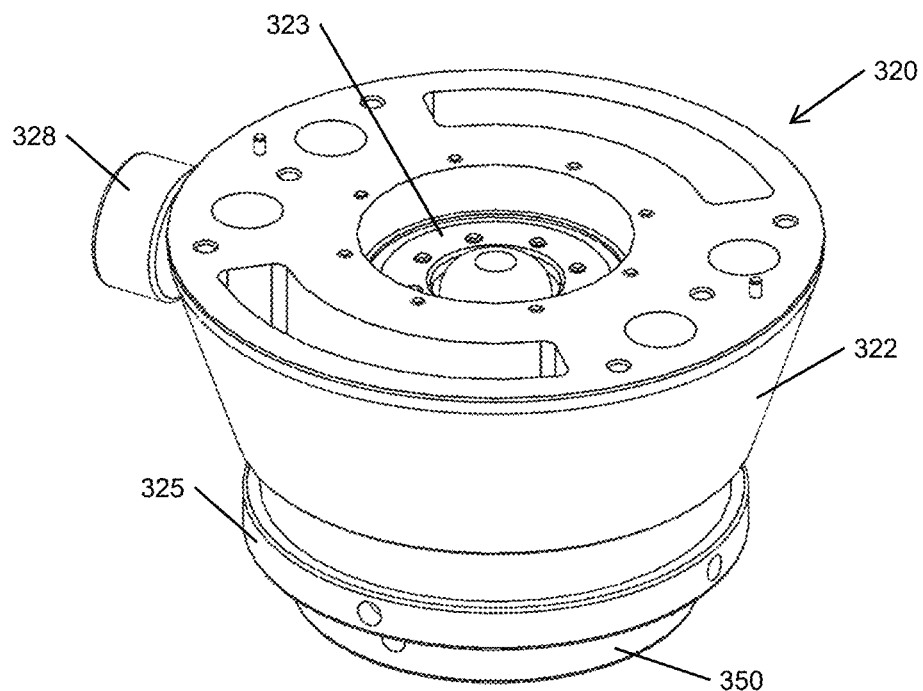
FIG. 2 is a perspective view of a pivot assembly of the present invention.
Figure 2A:
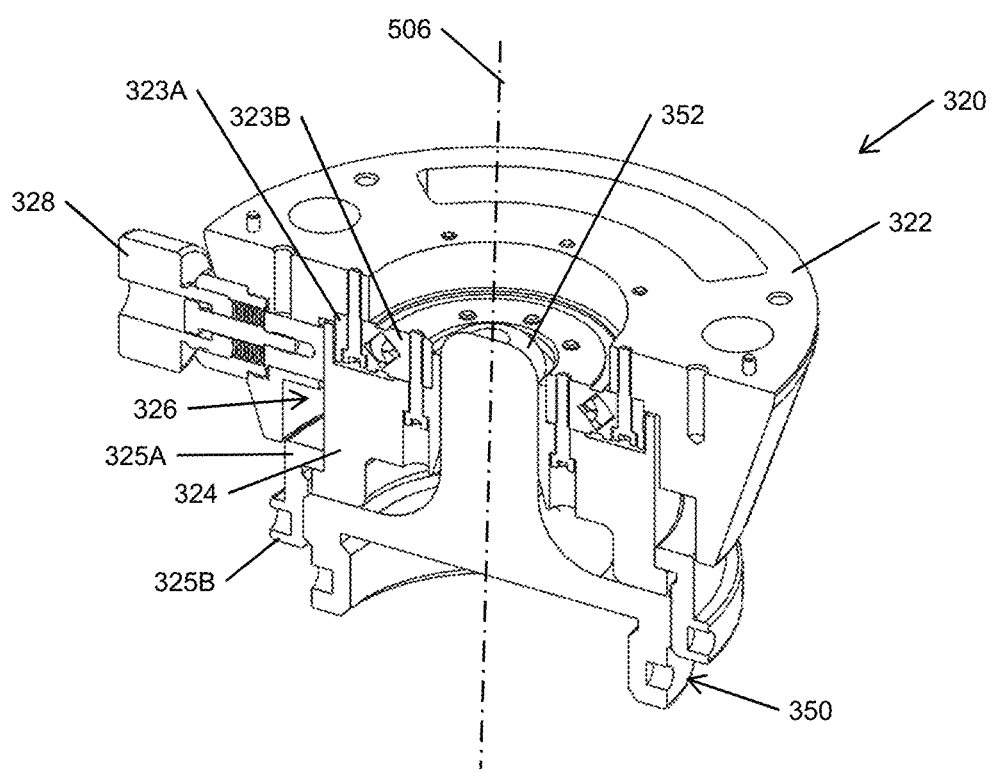
FIG. 2A is a sectional view of the pivot assembly of FIG. 2.

Referring to FIGS. 1D and 1E, some embodiments of the present invention include a pivot assembly 320 coupled to the base 310. Referring to FIGS. 2 and 2A, some embodiments of the pivot assembly 320 include an upper shroud 322 engaged with a pivot hub 324 such that the upper shroud 322 is capable of rotating relative to the pivot hub 324. In some embodiments, a bearing 323 is positioned between the upper shroud 322 and the pivot hub 324 so as to facilitate rotation of the upper shroud 322 relative to the pivot hub 324. In some such embodiments, a first ring 323A of the bearing 323 is secured to the upper shroud 322 and a second ring 323B of the bearing 323 is secured to the pivot hub 324. In some embodiments, the upper shroud 322 rotates about a sixth axis 506 (Ref. FIGS. 1 and 2A) such that the arm assembly 100 is capable of swinging about the sixth axis 506. In some such embodiments, the sixth axis 506 is a vertical axis. In some embodiments, a brake mechanism 328 is configured to interface with the upper shroud 322 and the pivot hub 324 so as to selectively prevent or otherwise inhibit the upper shroud 322 from rotating relative to the pivot hub 324.

In some embodiments, the upper shroud 322 envelops at least a portion of the pivot hub 324. In some embodiments, the brake mechanism 328 extends through the upper shroud 322 towards the pivot hub 324, so as to facilitate selective engagement with the upper shroud 322. In some such embodiments, the brake mechanism 328 is moveable between a retracted configuration and a deployed configuration. In the retracted configuration, a plunger of the brake mechanism 328 is displaced, at least slightly, from pivot hub 324 and/or is otherwise configured such that the brake mechanism 328 does not prevent the pivot hub 324 from rotating relative to the upper shroud 322. In some embodiments, moving the brake mechanism 328 to the deployed configuration causes the plunger of the brake mechanism 328 to engage with the pivot hub 324, thereby preventing and/or otherwise inhibiting the pivot hub 324 from rotating relative to the upper shroud 322. In some such embodiments, the engagement is a friction engagement and/or one or more positive mechanical engagement, such as the mechanical engagement of two or more corresponding features. In some embodiments, the brake mechanism 328 includes a knob or other feature for allowing a user to selectively move the brake mechanism 328 between respective retracted and deployed configurations.

In some embodiments, the base 310 is coupled to the upper shroud 322 and the pivot hub 324 is coupled to a support structure, such as a stationary support structure or a mobile support structure. In this way, the arm assembly 100 is capable of rotating relative to the support structure. Still referring to FIG. 2A, some embodiments of the pivot assembly 320 include a mounting hub 350 for facilitating securement of the pivot assembly 320 to the support structure. In some embodiments, the mounting hub 350 defines an internal thread and/or other feature for selective engagement with the support structure. In some embodiments, the mounting hub 350 defines one or more protrusion that is configured to be selectively received by one or more corresponding bore, such as a throughbore, or other interface feature, thereby facilitating alignment of the arm assembly 100 with, and securement of the arm assembly 100 to, the support structure. In some embodiments, at least a portion of one or more protrusion and/or respective bore defines a taper and/or other feature for facilitating alignment of the pivot hub 324 with the mounting hub 350.

As shown in FIG. 2A, some embodiments of the mounting hub 350 include a central protrusion 352 that is configured to selectively extend into a central throughbore of the pivot hub 324. In some such embodiments, a distal end of the central protrusion 352 defines a rounded edge and/or a bottom portion of the throughbore defines a taper, thereby facilitating alignment of the pivot hub 324 with the mounting hub 350.

In some embodiments, the pivot assembly 320 includes a locking ring 325 or other such feature for selectively securing the pivot hub 324 to the mounting hub 350. In some embodiments, the locking ring 325 defines internal threads and/or one or more other feature for selectively engaging the locking ring 325 with the mounting hub, thereby moving the support assembly 300 from a released configuration to a secured configuration. In the secured configuration, the pivot assembly 320, and the rest of the support assembly, as applicable, is secured to the support structure through the mounting hub 350. In some embodiments, the locking ring 325 includes a first portion 325A that is configured to engage with the pivot hub 324 and a second portion 325B that is configured to selectively engage with the mounting hub 350.

In some embodiments, the locking ring 325 and the pivot hub 324 define respective flanges that interface with each other when the support assembly 300 is in the secured configuration, thereby causing the pivot hub 324 to be sucked against the mounting hub 350. In some embodiments, the locking ring 325 is moveable between a stowed configuration and a deployed configuration, wherein the locking ring 325 is in the deployed configuration when the support assembly 300 is in the secured configuration. In some embodiments, the locking ring 325 is moved from the deployed configuration to the stowed configuration by moving the flange of the locking ring 325 away from the corresponding flange of the pivot hub 324. In some embodiments, the pivot assembly 320 defines a raceway 326 that is configured to receive the first portion 325A of the locking ring 325 when the locking ring 325 is in the stowed configuration. In some embodiments, the raceway 326 is defined by an interior surface of the upper shroud 322 and an exterior surface of the pivot hub 324. In some embodiments, the locking ring 325 is configured to be selectively secured in the stowed configuration.

In some embodiments, moving the locking ring 325 to the stowed configuration facilitates ease of alignment of the pivot hub 324 with the mounting hub 350 and/or removal of the pivot hub 324 from the mounting hub 350. In some embodiments, the mounting hub 350 is configured to be secured to the support structure so as to facilitate quick and easy interchangability of the support system 10 with one or more other support system or other system that is otherwise configured to secure to the mounting hub 350. In some embodiments, a plurality of mounting hubs 350 are installed to a plurality of support structures and/or a plurality of mounting hubs 350 are installed onto a single support structure, thereby facilitating quick and easy movement of the support system to one or more position and/or orientation so as to further increase the versatility of the system.

In some embodiments, the base 310 includes a proximal end 312 secured to the pivot assembly 320 and a distal end 314 displaced therefrom. In some embodiments, the base 310 is generally angled away from the sixth axis 506 such that the distal end 314 of the base 310 follows an arc around the sixth axis 506 as the base rotates about the sixth axis 506. In some embodiments, the base 310 is angled generally thirty degrees away from the sixth axis 506.

In some embodiments, the base 310 includes opposed first 330 and second 340 support blocks. In some embodiments, each support block extends from the proximal end 312 of the base 310 generally towards the distal end 314 of the base 310 and/or generally away from the pivot assembly 320. In some embodiments, each of the first 330 and second 340 support blocks is generally in the form of a lug that is configured to engage with respective opposed sides of the shoulder assembly 130. In some such embodiments, the first 330 and second 340 support blocks define the first axis 501 (Ref. FIGS. 1 and 3A). In some embodiments, the first axis 501 is generally perpendicular to the sixth axis 506. In some embodiments, the first axis 501 intersects the sixth axis 506.

Figure 4:
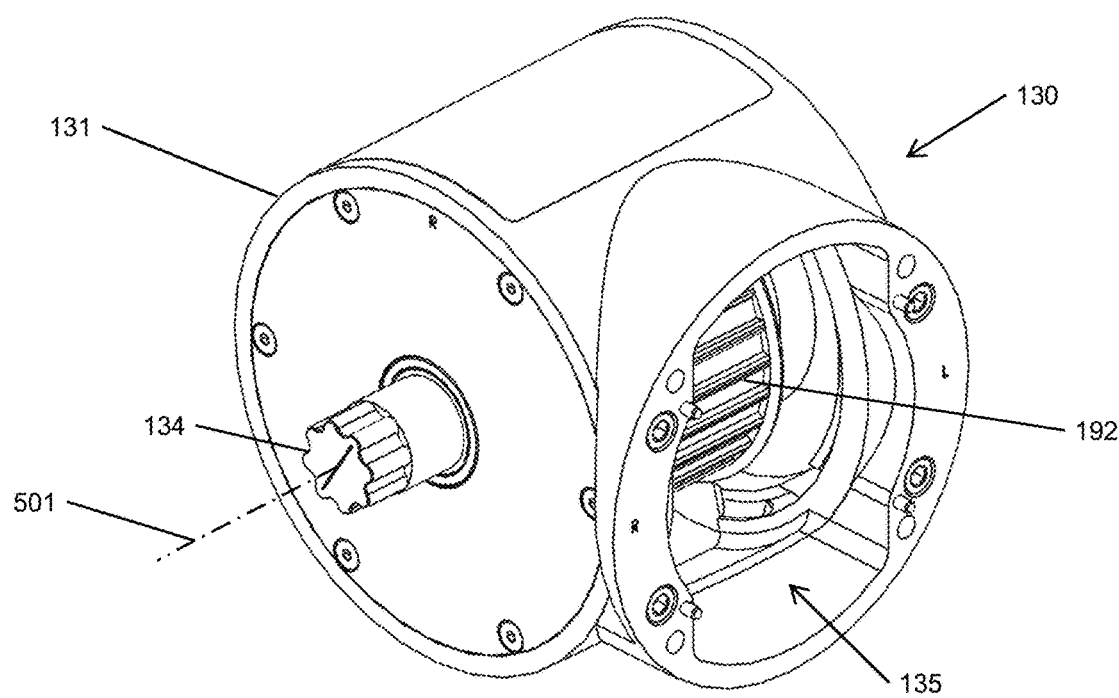
FIG. 4 is a perspective view of a shoulder assembly of the present invention.
Figure 4A:
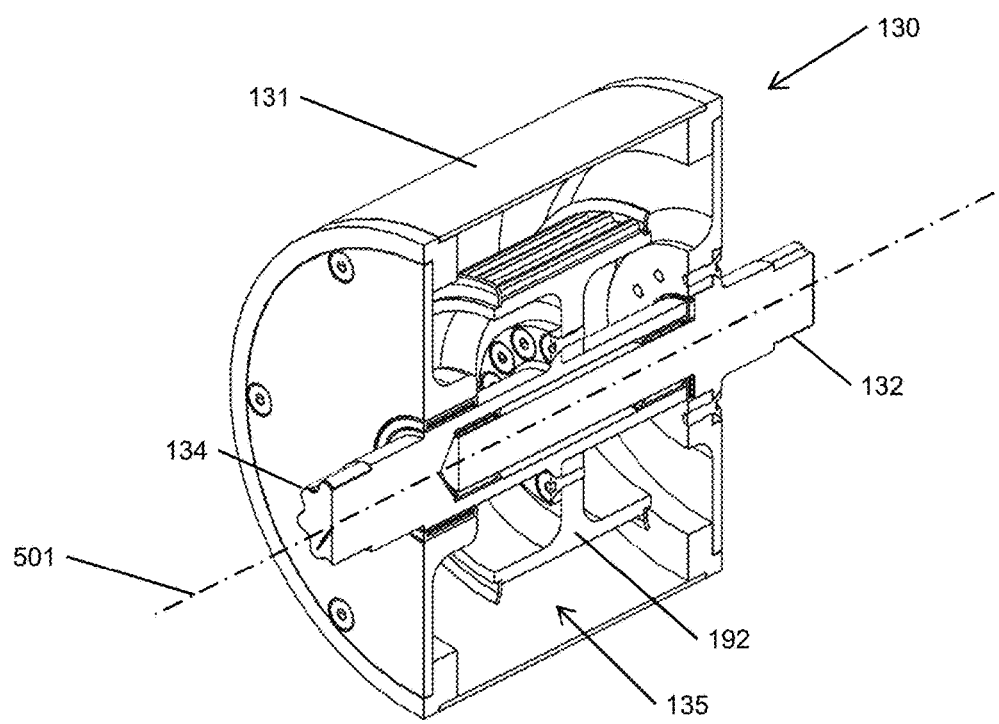
FIG. 4A is a sectional view of the shoulder assembly FIG. 4.
Figure 4B:
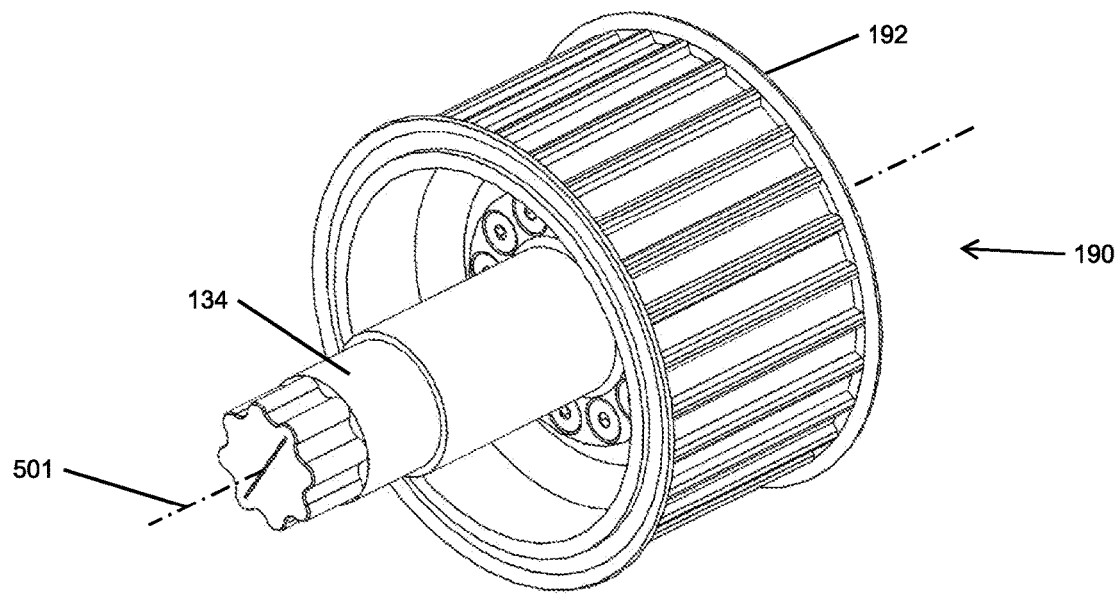
FIG. 4B is a perspective view of a second axle and a first gear of an embodiment of the present invention.
Figure 4C:
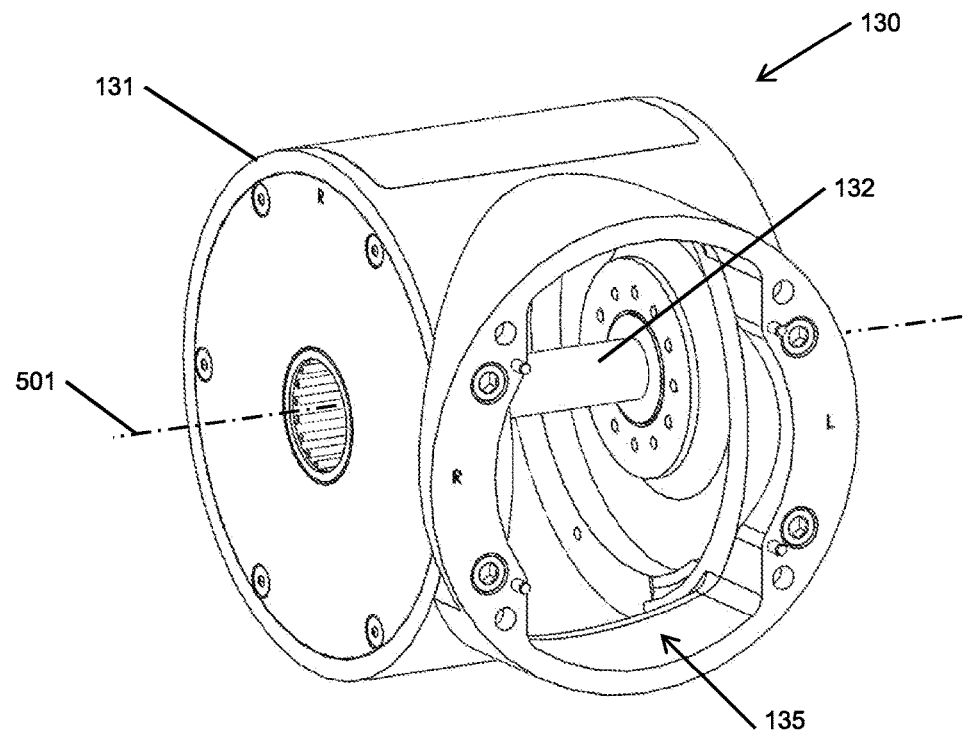
FIG. 4C is a perspective view of the shoulder assembly of FIG. 4 with the second axle and first gear of FIG. 4B being removed for clarity.

Referring to FIGS. 4 and 4A, some embodiments of shoulder assemblies 130 of the present invention include first 132 and second 134 axles engaged with respective first 330 and second 340 support blocks of the base 310. In some embodiments, the shoulder assembly 130 includes an outer shell 131 defining an interior area 135. In some embodiments, the first 132 and second 134 axles extend into the interior area 135 from opposed first and second sides of the outer shell 131. In some embodiments, the first axle 132 is configured to engage with the second axle 134 in such a way that the first 132 and second 134 axles are capable of rotating independent of each other. In some such embodiment, each axle is configured to rotate about the first axis 501.

In some embodiments, the first axle 132 is secured to the outer shell 131 of the shoulder assembly such that rotation of the first axle 132 causes the outer shell 131 to rotate. In some embodiments, the second axle 134 extends through the outer shell 131 of the shoulder assembly in such a way that the second axle 134 and the outer shell 131 of the shoulder assembly 130 are capable of rotating independent of each other. In this way, rotation of the upper arm 140 can be accomplished independent of rotation of the second axle 134. In some embodiments, a distal end of the first axle 132 is configured to be received by the second axle 134. In some such embodiments, the first axle 132 is configured to rotate independent of the second axle 134. In some embodiments, the first 132 and second 134 axles of the shoulder assembly 130 are configured to rotate independently about the first axis 501.

Figure 3:
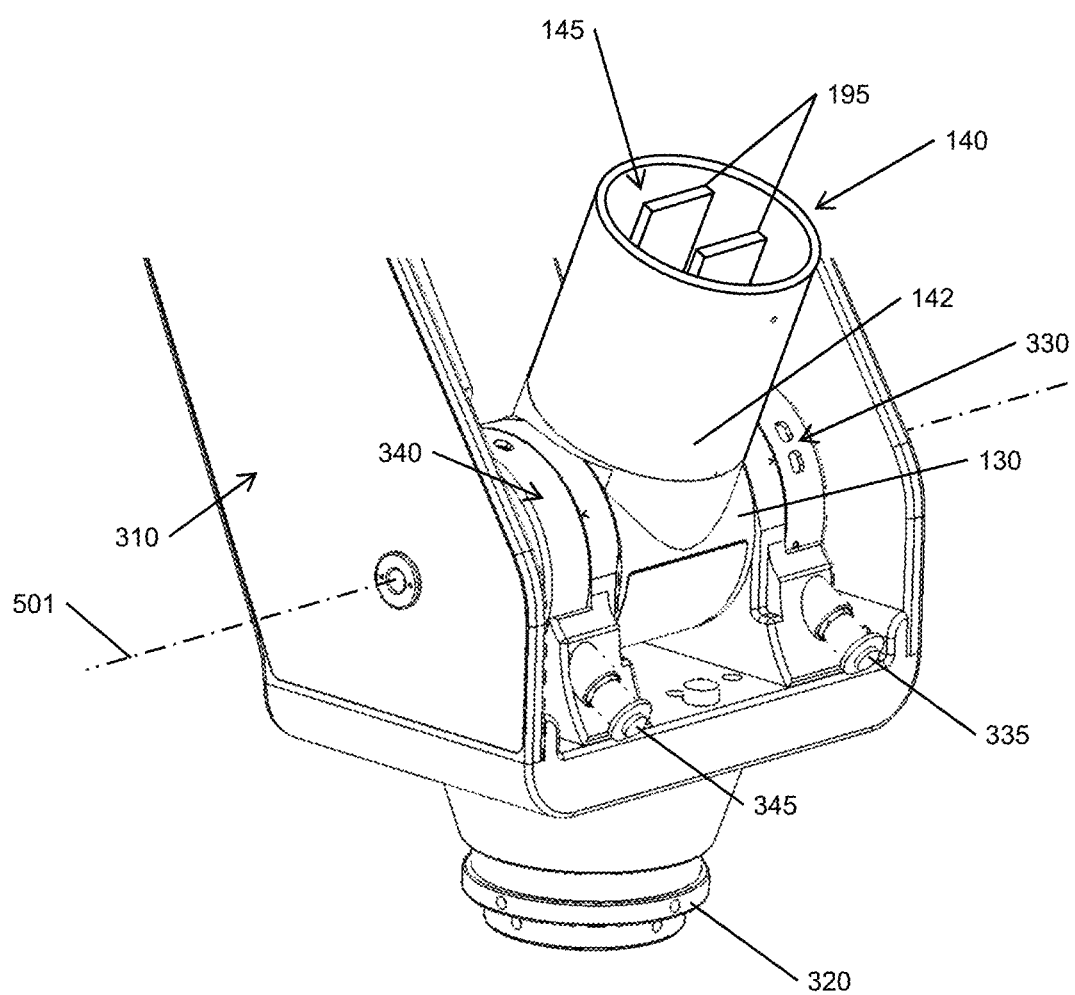
FIG. 3 is a partial detail view of the embodiment of FIG. 1 shown on an enlarged scale.
Figure 3A:
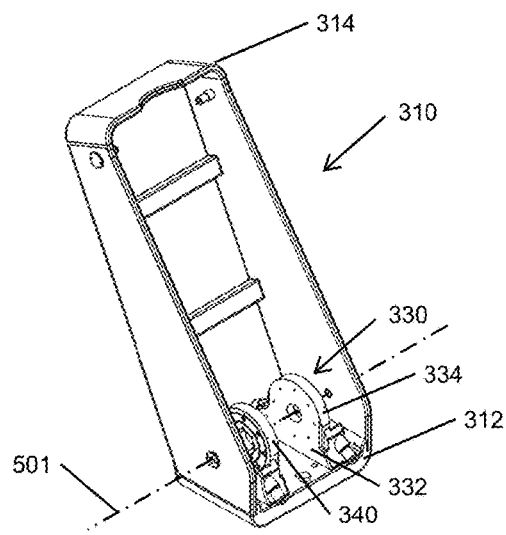
FIG. 3A is a perspective view of a base of the present invention.
Figure 3B:
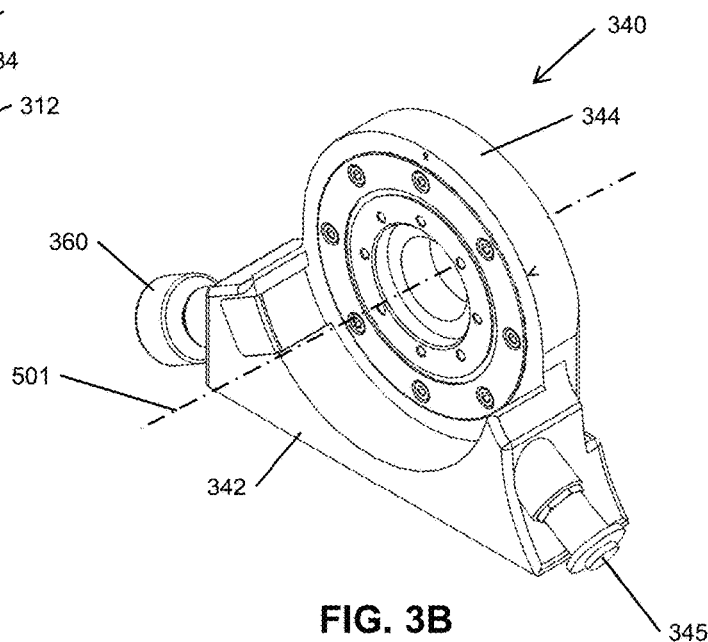
FIG. 3B is a perspective view of a support block of the present invention.
Figure 3C:
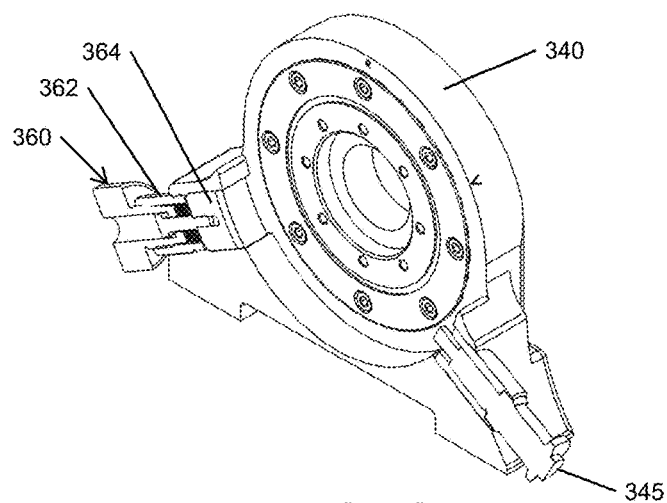
FIG. 3C is a sectional view of the support block of FIG. 3B.

Referring to the embodiment shown in FIG. 3, a proximal end 142 of the upper arm 140 is coupled to the outer shell 131 of the shoulder assembly 130. In some such embodiments, rotation of the outer shell 131 about the first axis 501 causes a distal end 144 of the upper arm 140 to follow an arc around the first axis 501 as the upper arm 140 pivots about the first axis 501. Referring to the embodiment shown in FIG. 1A, an elbow assembly 150 is coupled to the distal end 144 of the upper arm 140 such that pivoting the upper arm 140 about the first axis 501 causes the elbow assembly to move along an arc around the first axis 501.

Figure 5:
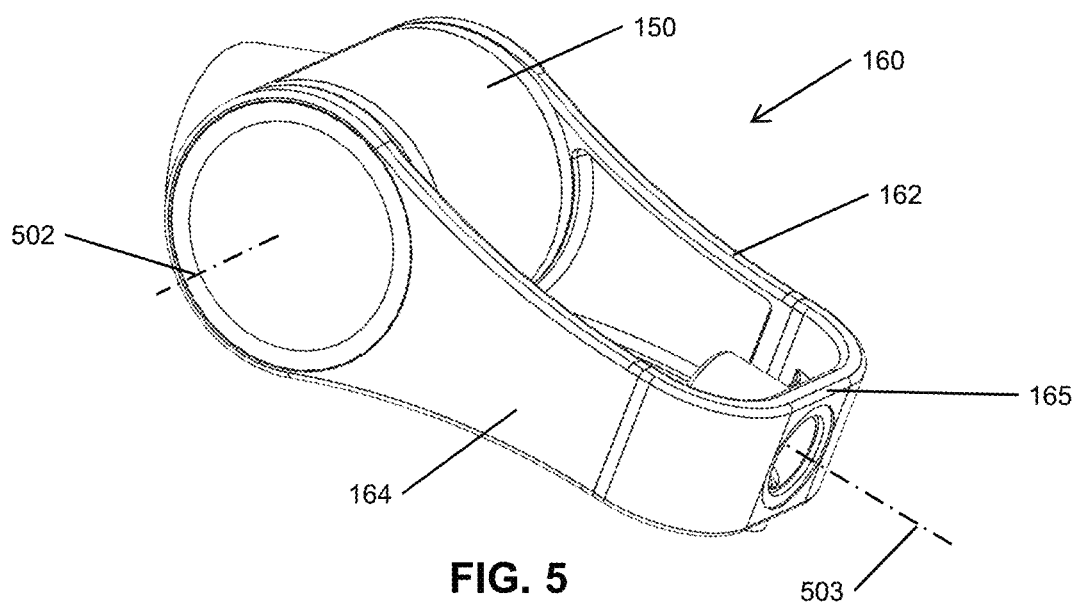
FIG. 5 is a perspective view of an elbow assembly and a forearm of an embodiment of the present invention.
Figure 5A:
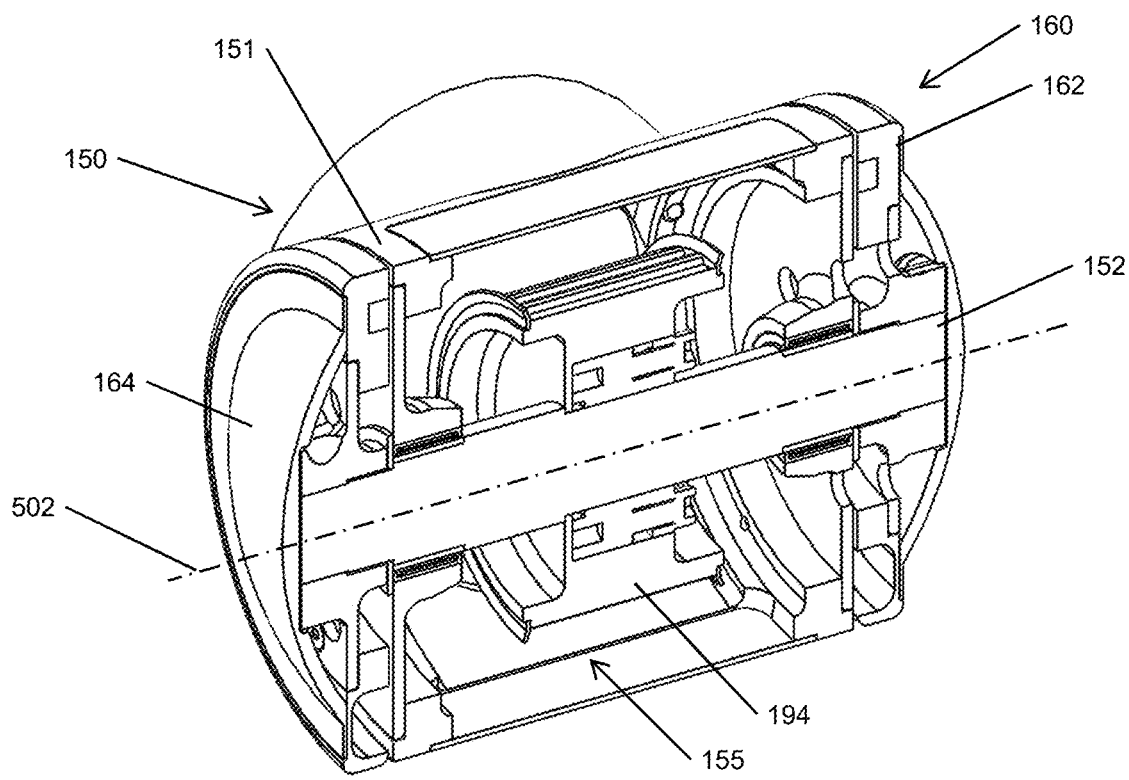
FIG. 5A is a sectional view of the elbow assembly and forearm of FIG. 5.

Referring to FIGS. 5 and 5A, some embodiments of the elbow assembly 150 of the present invention include an outer shell 151 defining an interior area 155. In some such embodiments, a third axle 152 having opposed first and second ends is positioned partially within the interior area 155 of the elbow assembly 150 with the first and second ends extending through respective first and second sides of the outer shell 151. In some embodiments, the first and second ends of the third axle 152 are received by respective first and second sides of the outer shell 151 of the elbow assembly 150 in such a way that the third axle 152 is capable of rotating independent of the outer shell 151 of the elbow assembly 150. In some embodiments, the third axle rotates about a second axis 502. In some embodiments the second axis 502 is parallel with the first axis 501.

In some embodiments, the forearm 160 is secured to the third axle 152 such that rotation of the third axle 152 causes the forearm 160 to rotate. In some such embodiments, the forearm 160 includes opposed first 162 and second 164 plates, each having opposed proximal and distal ends, with the proximal end of each plate being coupled to a respective first or second end of the third axle 152. In some embodiments, the forearm 160 further includes a bulkhead 165 extending between respective distal ends of the first 162 and second 164 plates. In this way, rotation of the forearm 160 repositions the bulkhead 165 relative to the third axle 152. In some such embodiments, rotating the forearm 160 causes the bulkhead 165 to move along an arc around the second axis 502.

Referring to FIGS. 4A, 5A, 6, 6A, and 10, some embodiments of the present invention include a drive assembly 190 having a first gear 192 positioned within the interior area 135 of the shoulder assembly 130 and a second gear 194 positioned within the interior area 155 of the elbow assembly 150. The first 192 and second 194 gears are mechanically linked such that rotation of the first gear 192 causes the second gear 194 to rotate. In some such embodiments, the first gear 192 is coupled to the second axle 134 and the second gear 194 is coupled to the third axle 152 such that rotation of the second axle 134 causes the third axle 152 to rotate, thereby causing the forearm 160 to rotate. In some embodiments, the first 192 and/or second 194 gear is secured to a respective second 134 and third 152 axles using a taper lock bushing, one or more bolt, one or more key, and/or one or more other securing feature now known or later developed.

Figure 6:
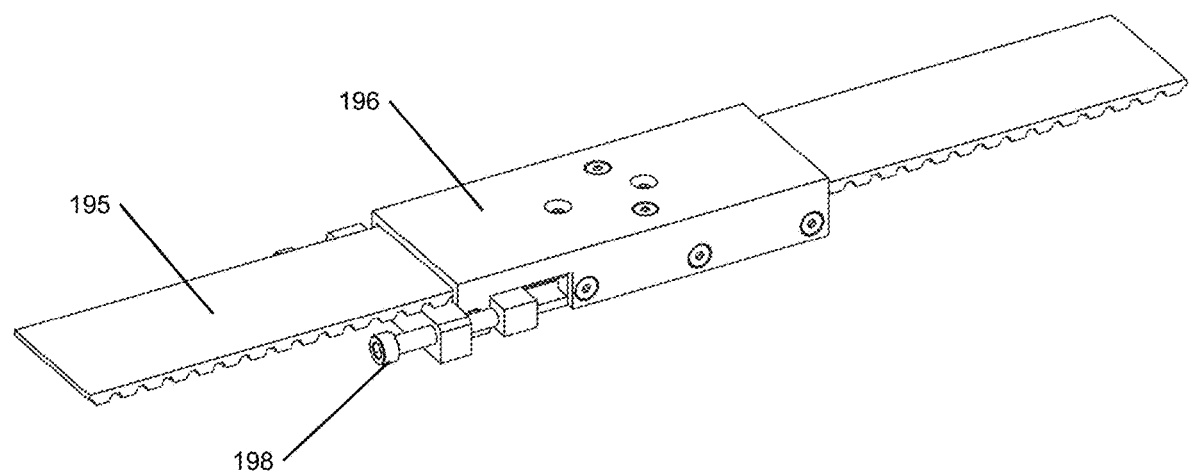
FIG. 6 is a perspective view of a portion of a drive assembly of an embodiment of the present invention.
Figure 6A:
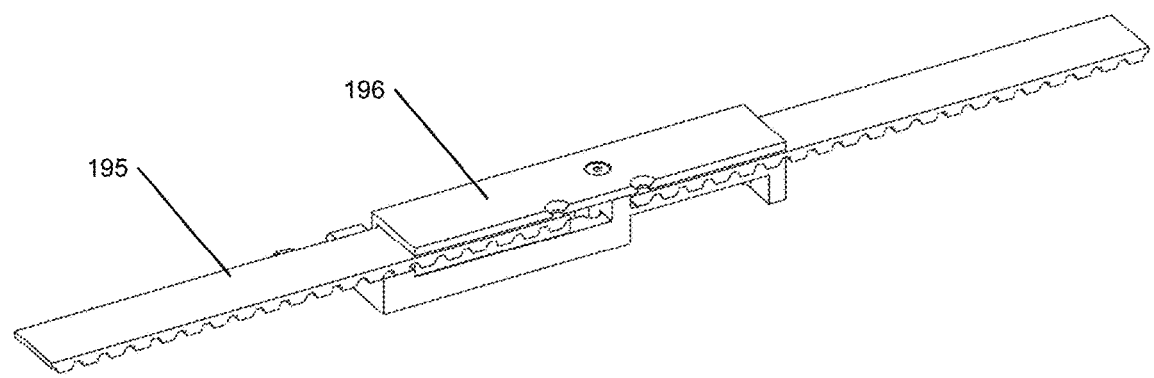
FIG. 6A is a sectional view of the portion of the drive assembly shown in FIG. 6.
Figure 7:
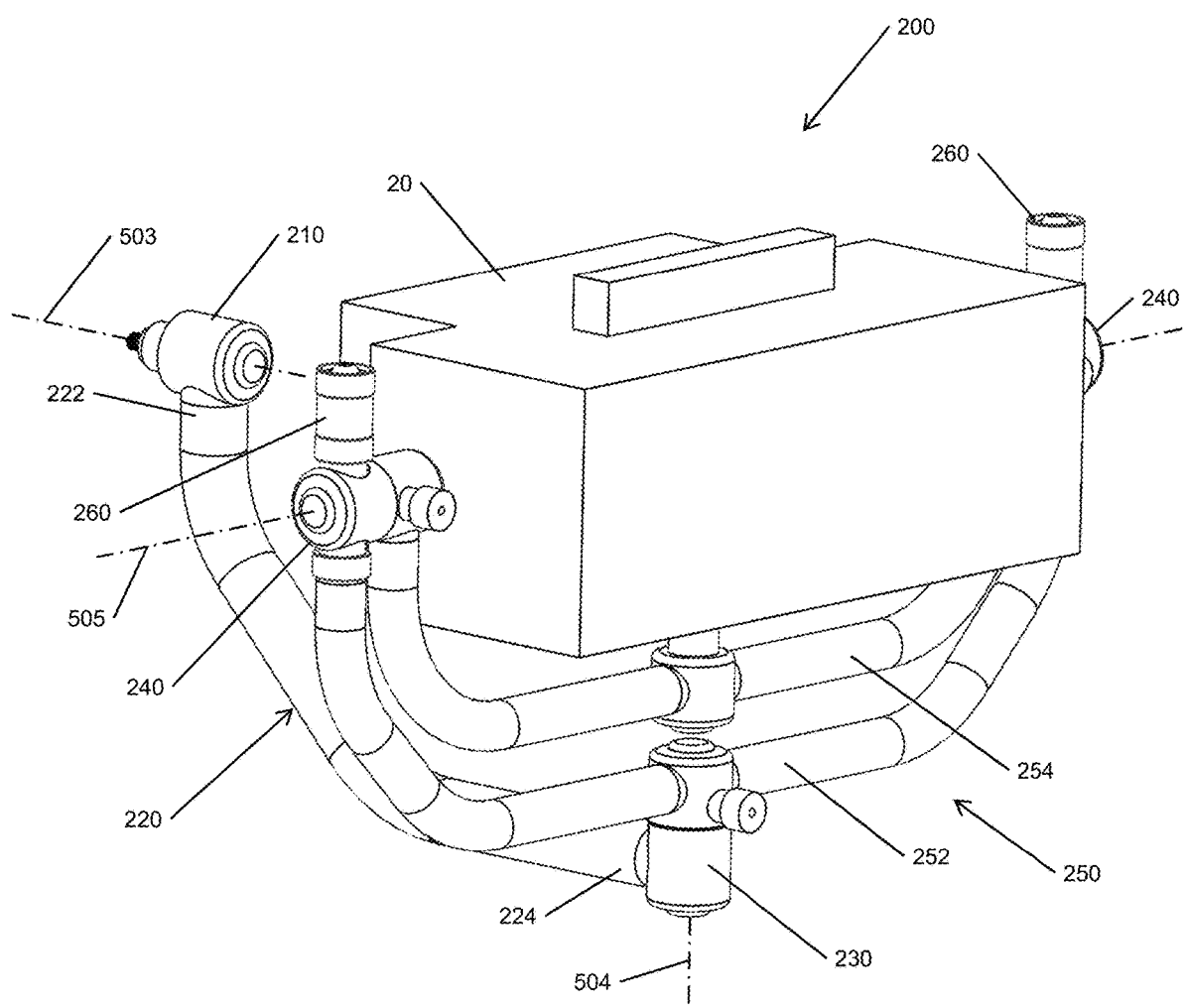
FIG. 7 is a perspective view of a hand assembly of an embodiment of the present invention, the hand assembly shown holding an object.
Figure 7A:
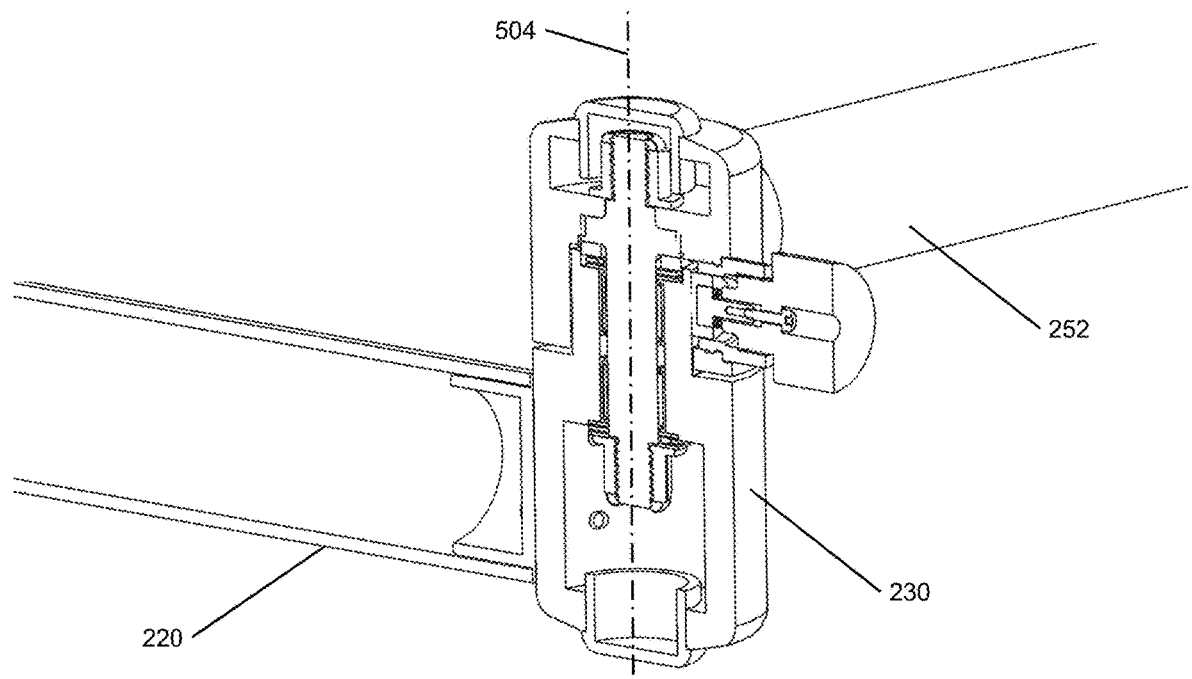
FIG. 7A is a sectional view of a first hand joint of the hand assembly of FIG. 7.
Figure 7B:
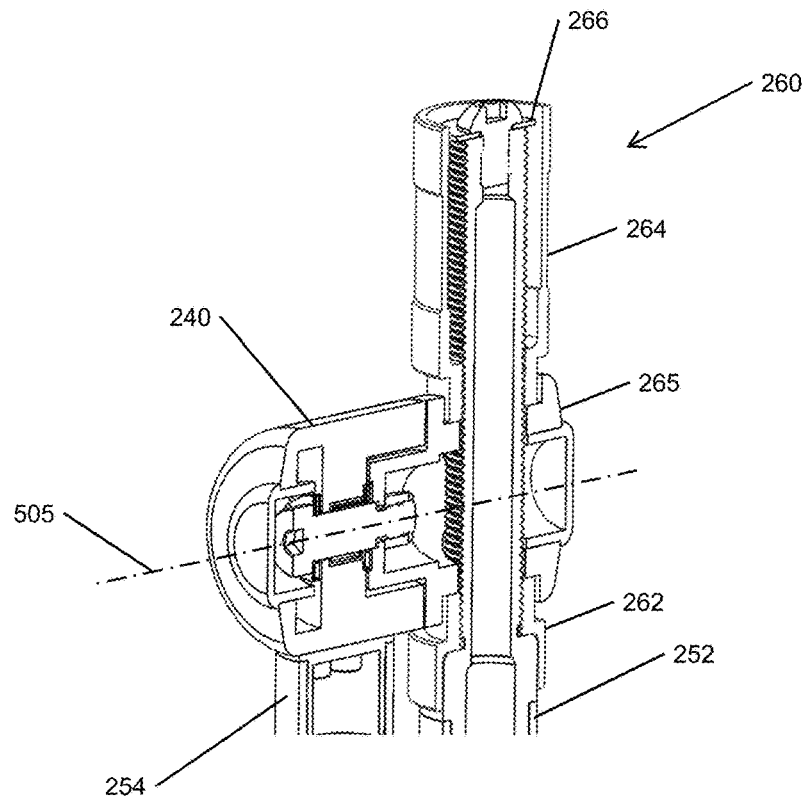
FIG. 7B is a sectional view of a second hand joint of the hand assembly of FIG. 7.
Figure 8:
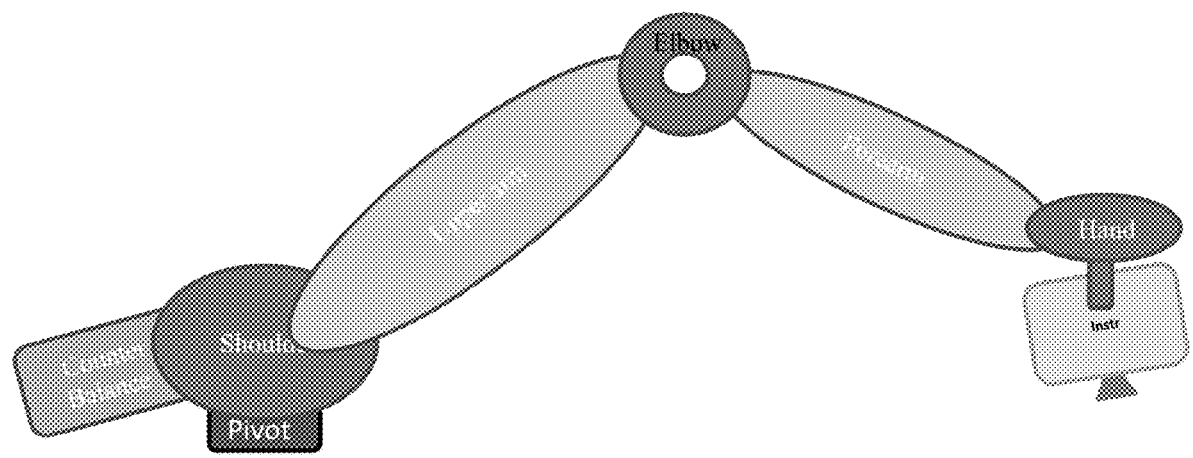
FIG. 8 is a graphical representation of the embodiment of FIG. 1.
Figure 9:
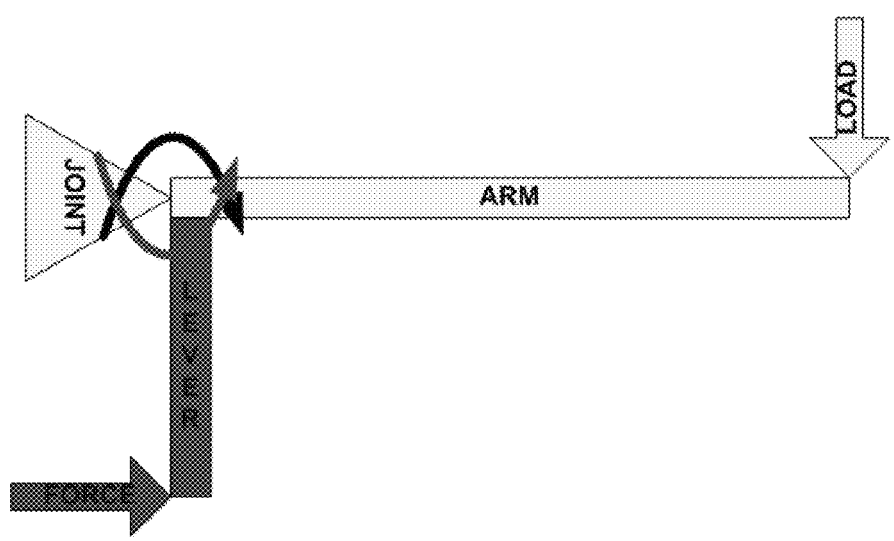
FIG. 9 is a graphical representation of a free-body diagram associated with the embodiment of FIG. 1.
Figure 10:
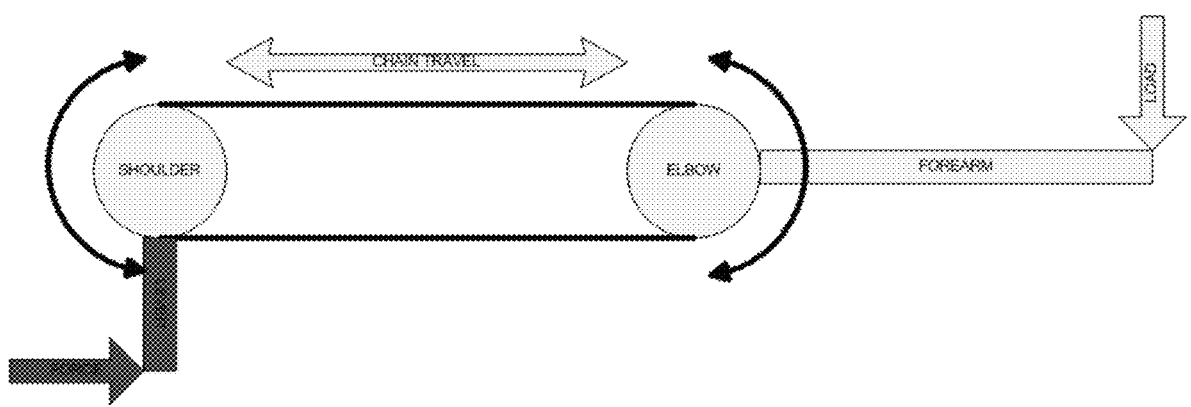
FIG. 10 is a graphical representation of a free-body diagram associated with the embodiment of FIG. 1.

In some embodiments, the drive assembly 190 further includes an elongate member 195 extending between, and engaging with, the first 192 and second 194 gears. In some such embodiments, the elongate member 195 is a belt, a chain, or the like. In some embodiments, the elongate member 195 includes a first portion extending from a first end of the elongate member 195 towards the first gear 192, a second portion extending from a second end of the elongate member 195 towards the second gear 194, and a third portion extending between the first and second gears such that the first and second portions extend towards each other, each being displaced from the third portion. Referring to FIGS. 6 and 6A, some embodiments of the present invention include a linkage member 196 secured to each of the first and second ends of the elongate member 195, thereby preventing the respective ends of the elongate member 195 from moving away from each other. In some embodiments, the linkage member 196 includes a tensioning member 198 that is configured to bias the first and second ends of the elongate member 195 towards each other, thereby reducing the possibility that the elongate member 195 will become disengaged from the first 192 or second 194 gear.

Referring to FIG. 3, some embodiments of the upper arm 140 define an interior area 145 extending between the proximal 142 and distal 144 ends of the upper arm 140. In this way, the upper arm 140 defines opposed proximal and distal openings, with the proximal opening being in communication with the interior area 135 of the shoulder assembly 130 and the distal opening being in communication with the interior area 155 of the elbow assembly 150. In some such embodiments, the elongate member 195 extends through the interior area 145 of the upper arm 140. In some embodiments, the linkage member 196 is positioned at least partially within the interior area 145 of the upper arm 140. In some such embodiments, the linkage member 196 moves towards the first gear 192 and away from the second gear 194 when the first 192 and second 194 gears are rotated in a first direction. In other such embodiments, the linkage member 196 moves away from the first gear 192 and towards the second gear 194 when the first 192 and second 194 gears are rotated in a second direction. In some embodiments, the linkage member 196 is positioned relative to the first 192 and second 194 gears such that it never reaches the first 192 or second 194 gear as the forearm 160 is moved between the extended and retracted configurations.

Referring to FIG. 1, some embodiments of the present invention include first 370 and second 380 counterbalance assemblies. In some embodiments, the first counterbalance assembly 370 is coupled to the first axle 132 and the second counterbalance assembly 380 is coupled to the second axle 134. In this way, the first 370 and second 380 counterbalance assemblies are configured to counter loads associated with the upper arm 140 and the forearm 160, respectively, so as to facilitate movement of the upper arm 140 and the forearm 160 and/or so as to prevent movement of the same. In some embodiments, the first 370 and second 380 counterbalance assemblies include respective first 372 and second 382 counterbalance mechanisms for generating and/or resisting one or more load. In some embodiments, at least one such counterbalance mechanism is a spring member, such as a mechanical spring or a gas cylinder spring. In some embodiments, at least one counterbalance mechanism includes at least one telescoping member that is movable between an extended configuration and a contracted configuration.

Figure 3D:
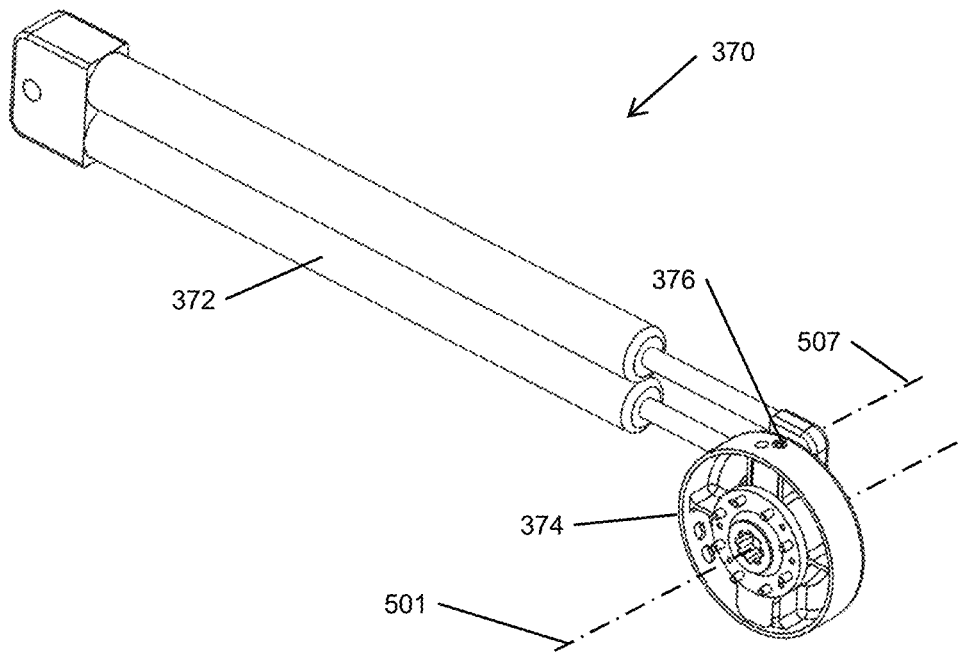
FIG. 3D is a perspective view of a first counterbalance assembly of the present invention.
Figure 3E:
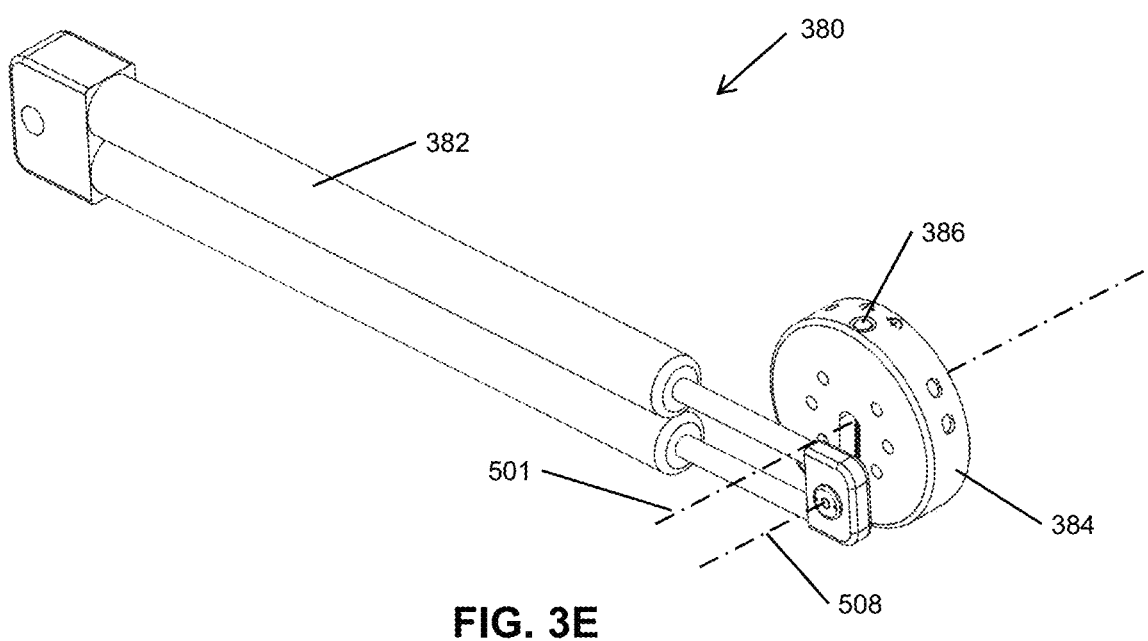
FIG. 3E is a perspective view of a second counterbalance assembly of the present invention.
Figure 3F:
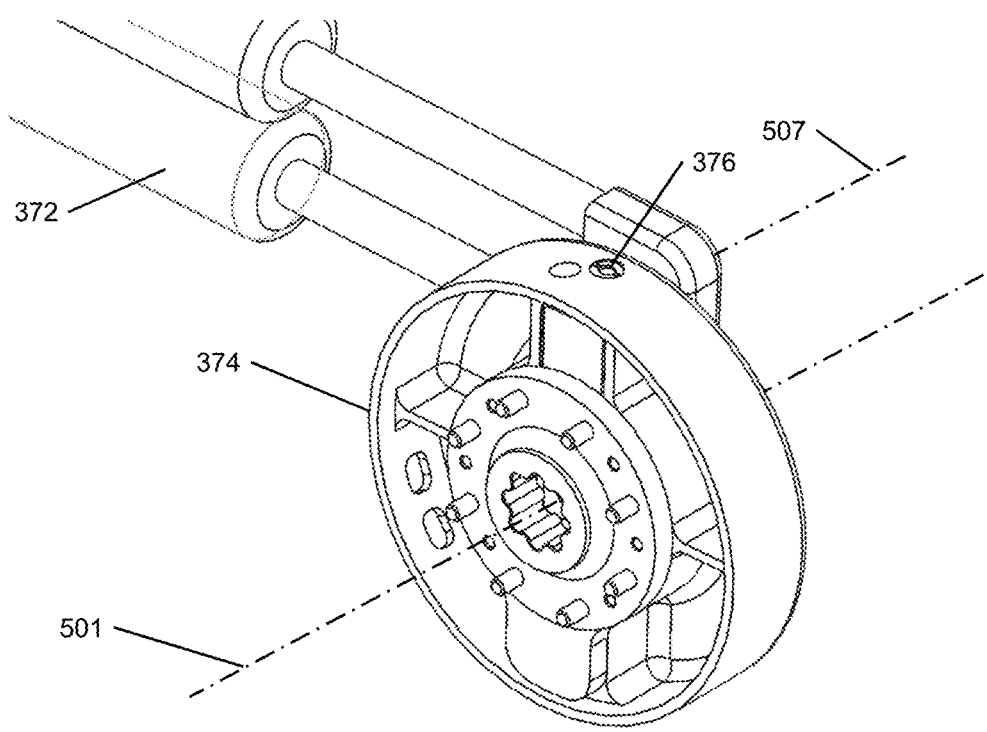
FIG. 3F is a partial detail view of the first counterbalance assembly of FIG. 3D shown on an enlarged scale.

Referring to FIGS. 3D and 3F, some embodiments of the first counterbalance assembly 370 include a first hub assembly 374 that is coupled to the first axle 132 of the shoulder assembly 130 such that rotation of the first hub assembly 374 causes the first axle 132 to rotate about the first axis 501. In some embodiments, a proximal end of the first axle 132 defines a hex configuration, a multi-lobe configuration, or some other mechanical interface configuration now known or later developed. In some embodiments, the first hub assembly 374 includes a corresponding configuration for mechanical engagement with the first axle 132.

In some embodiments, the first counterbalance mechanism 372 is rotatably coupled to the first hub assembly 374, thereby defining a seventh axis 507 (Ref. FIG. 3D). In some embodiments, the seventh axis 507 is generally parallel with the first axis 501. In some embodiments, the first hub assembly 374 rotates about the first axis 501 such that rotation of the first hub assembly 374 causes the seventh axis 507 to move along an arc around the first axis 501. In some embodiments, the first counterbalance mechanism 372 includes one or more telescoping member that is moveable between an expanded configuration and a retracted configuration. In this way, expanding or contracting the first counterbalance mechanism 372 causes the first hub assembly 374 to rotate about the first axis 501, thereby causing the upper arm 140 to move relative to its lowered and raised configurations.

In some embodiments, the first hub assembly 374 is configured to engage with the first support block 330. In some embodiments, the first support block 330 includes a base plate 332 coupled to the base 310 of the support assembly 300 and a lug 334 extending therefrom. In some embodiments, the first support block 330 includes pins, bolts, or the like and/or defines corresponding apertures, such as threaded apertures, as applicable, so as to facilitate selective engagement and/or securement of the first hub assembly 374 to the first support block 330. In some embodiments, the first hub assembly 374 is coupled to a bearing and/or bushing of the first support block 330 so as to facilitate rotation of the first hub assembly 374 relative to the first support block 330. In some embodiments, the support assembly 300 includes one or more brake assembly 360 and/or a first safety button 335 that is configured to selectively prevent or otherwise inhibit the first hub assembly 374 from rotating relative to the first support block 330.

In some embodiments, the first support block 330 includes one or more feature for receiving a first safety button 335 such that the first safety button 335 is configured to selectively engage with the first hub assembly 374. In some embodiments, the first safety button 335 includes a biasing member, such as a spring, for biasing a distal end of the first safety button 335 towards the first hub assembly 374. In some embodiments, the first hub assembly 374 defines one or more aperture, such as a hole or a slot, for selectively receiving the distal end of the first safety button 335. In this way, rotation of the first hub assembly 374 can be limited and/or prevented. In some embodiments, the first safety button 335 is configured to move between a standby configuration and an activated configuration. In some such embodiments, the distal end of the first safety button 335 is displaced from the first hub assembly 374 when the first safety button 335 is in the standby configuration. In some embodiments, the first safety button 335 is configured to move from the standby configuration to the activated configuration upon activation by a user, upon detecting a rapid movement of the arm 100 and/or hand 200 assembly, and/or upon one or more other condition precedent.

In some embodiments, the upper arm 140 is configured to support vertical and rotational loads associated with the forearm 160 and the hand assembly 200. In some such embodiments, the vertical and rotational loads associated with the forearm 160 and the hand assembly 200 are countered by a resultant moment at the shoulder assembly 130. In some embodiments, at least part of the resultant moment is produced by the first counterbalance assembly 370. In some such embodiments, the first counterbalance mechanism 372 excerpts a longitudinal load on the first hub assembly 374 at an interface location that is displaced from a rotational axis of the first axle 132 such that the first hub assembly 374 operates as a cam member for the first axle 132. In some such embodiments, the first hub assembly 374 includes a first adjustment assembly 376 for repositioning the interface location, thereby changing the resultant moment generated by the first counterbalance assembly 370 to more closely counter the resultant moment created by the vertical and rotational loads associated with the forearm 160 and the hand assembly 200. In some embodiments, the first adjustment assembly 376 is adjustable as a spring rate of the first counterbalance mechanism 372 changes, thereby allowing the first counterbalance assembly 370 to generate a constant resultant moment as the spring rate of the first counterbalance mechanism 372 changes. In other embodiments, the spring rate of the first counterbalance mechanism is relatively constant.

Figure 3G:
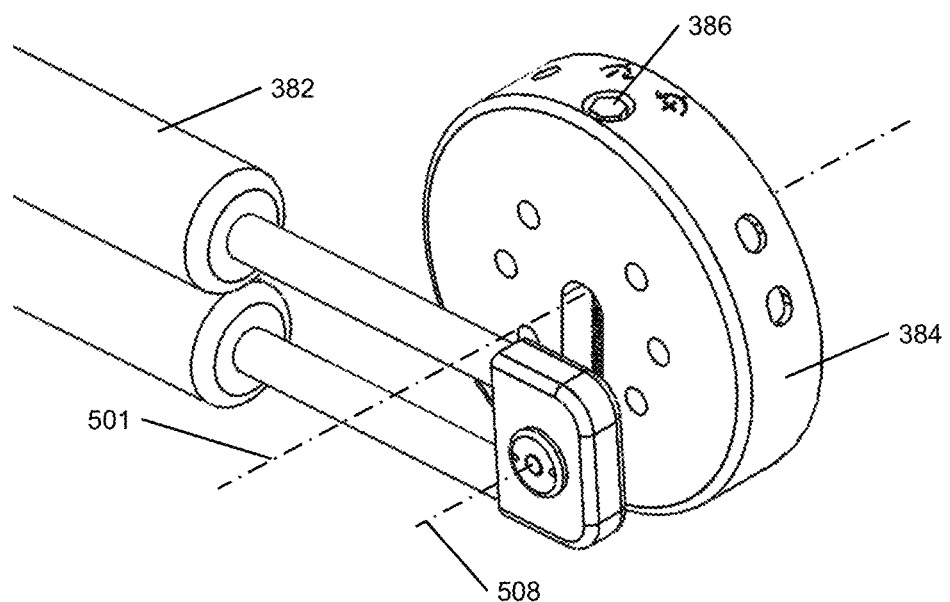
FIG. 3G is a partial detail view of the second counterbalance assembly of FIG. 3E shown on an enlarged scale.
Figure 3H:
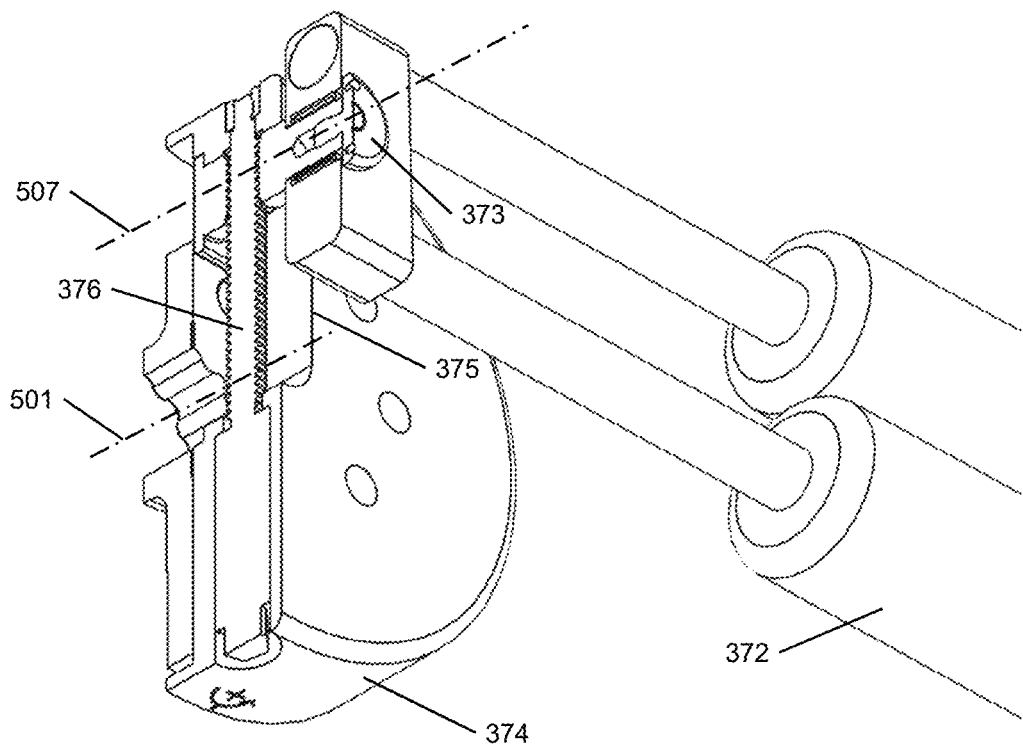
FIG. 3H is a sectional view of the first counterbalance assembly of FIG. 3D showing a sectional view of a first adjustment assembly.

Referring to FIG. 3H, some embodiments of the first counterbalance assembly 370 include a pin 373 extending from a distal end of the first counterbalance mechanism 372 into engagement with the first hub assembly 374. In some embodiments, the pin 373 rotatably couples the first counterbalance mechanism 372 to the first hub assembly 374 such that a longitudinal axis of the pin 373 is collinear with the seventh axis 507. In some embodiments, the first hub assembly 374 defines a slot 375 for receiving a distal end of the pin 373 so as to allow the seventh axis 507 to be moved relative to the first axis 501. In some embodiments, the slot 375 and the pin 373 are configured so as to allow the seventh axis 507 to be moved into alignment with the first axis 501 such that the first 501 and seventh 507 axes are collinear. In this way, the first counterbalance assembly 370 is capable of being effectively disconnected from the arm assembly 100 without physically disconnecting the first counterbalance assembly 370 from the arm assembly 100.

In some embodiments, the first adjustment assembly 376 includes a threaded bolt that extends into the slot 375 of the first hub assembly 374. In some such embodiments, the distal end of the pin 373 defines threads that are configured to engage with the threaded bolt of first adjustment assembly 376, thereby allowing the pin 373 to be moved within the slot 375 by rotating the threaded bolt of the first adjustment assembly 376.

Referring to FIGS. 3E and 3G, some embodiments of the second counterbalance assembly 380 include a second hub assembly 384 that is coupled to the second axle 134 of the shoulder assembly 130 such that rotation of the second hub assembly 384 causes the second axle 134 to rotate about the first axis 501. In some embodiments, a proximal end of the second axle 134 defines a hex configuration, a multi-lobe configuration, or some other mechanical interface configuration now known or later developed. In some embodiments, the second hub assembly 384 includes a corresponding configuration for mechanical engagement with the second axle 134.

In some embodiments, the second counterbalance mechanism 382 is rotatably coupled to the second hub assembly 384, thereby defining an eighth axis 508 (Ref. FIG. 3E). In some embodiments, the eighth axis 508 is generally parallel with the first axis 501. In some embodiments, the second hub assembly 384 rotates about the first axis 501 such that rotation of the second hub assembly 384 causes the eighth axis 508 to move along an arc around the first axis 501. In some embodiments, the second counterbalance mechanism 382 includes one or more telescoping member that is moveable between an expanded configuration and a retracted configuration. In this way, expanding or contracting the second counterbalance mechanism 382 causes the second hub assembly 384 to rotate about the first axis 501, thereby causing the forearm 160 to move relative to its retracted and extended configurations.

In some embodiments, the second hub assembly 384 is configured to engage with the second support block 340. In some embodiments, the second support block 340 includes a base plate 342 coupled to the base 310 of the support assembly 300 and a lug 344 extending therefrom. In some embodiments, the second support block 340 includes pins, bolts, or the like and/or defines corresponding apertures, such as threaded apertures, as applicable, so as to facilitate selective engagement and/or securement of the second hub assembly 384 to the second support block 340. In some embodiments, the second hub assembly 384 is coupled to a bearing and/or bushing of the second support block 340 so as to facilitate rotation of the second hub assembly 384 relative to the second support block 340. In some embodiments, the support assembly 300 includes one or more brake assembly 360 and/or a second safety button 345 that is configured to selectively prevent or otherwise inhibit the second hub assembly 384 from rotating relative to the second support block 340.

In some embodiments, the second support block 340 includes one or more feature for receiving a second safety button 345 such that the second safety button 345 is configured to selectively engage with the second hub assembly 384. In some embodiments, the second safety button 345 includes a biasing member, such as a spring, for biasing a distal end of the second safety button 345 towards the second hub assembly 384. In some embodiments, the second hub assembly 384 defines one or more aperture, such as a hole or a slot, for selectively receiving the distal end of the second safety button 345. In this way, rotation of the second hub assembly 384 can be limited and/or prevented. In some embodiments, the second safety button 345 is configured to move between a standby configuration and an activated configuration. In some such embodiments, the distal end of the second safety button 345 is displaced from the second hub assembly 384 when the second safety button 345 is in the standby configuration. In some embodiments, the second safety button 345 is configured to move from the standby configuration to the activated configuration upon activation by a user, upon detecting a rapid movement of the and/or hand 200 assembly, and/or upon one or more other condition precedent.

In some embodiments, the forearm 160 is configured to support vertical and rotational loads associated with the hand assembly 200. In some such embodiments, the vertical and rotational loads associated with the hand assembly 200 are countered by a resultant moment at the shoulder assembly 130 by way of a drive assembly 190. In some embodiments, at least part of the resultant moment is produced by the second counterbalance assembly 380. In some such embodiments, the second counterbalance mechanism 382 excerpts a longitudinal load on the second hub assembly 384 at an interface location that is displaced from a rotational axis of the second axle 134 such that the second hub assembly 384 operates as a cam member for the second axle 134. In some such embodiments, the second hub assembly 384 includes a second adjustment assembly 386 for repositioning the interface location, thereby changing the resultant moment generated by the second counterbalance assembly 380 to more closely counter the resultant moment created by the vertical and rotational loads associated with the hand assembly 200. In some embodiments, the second adjustment assembly 386 is adjustable as a spring rate of the second counterbalance mechanism 382 changes, thereby allowing the second counterbalance assembly 380 to generate a constant resultant moment as the spring rate of the second counterbalance mechanism 382 changes. In other embodiments, the spring rate of the second counterbalance mechanism 382 is relatively constant.

Figure 3I:
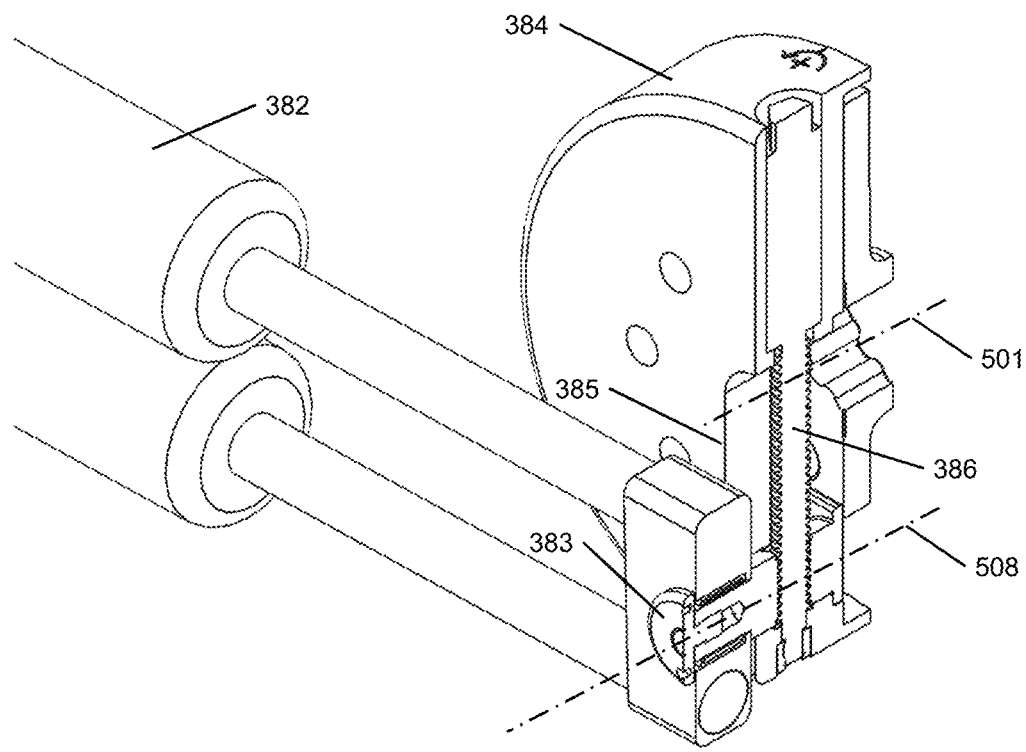
FIG. 3I is a sectional view of the second counterbalance assembly of FIG. 3E showing a sectional view of a second adjustment assembly.

Referring to FIG. 3I, some embodiments of the second counterbalance assembly 380 include a pin 383 extending from a distal end of the second counterbalance mechanism 382 into engagement with the second hub assembly 384. In some embodiments, the pin 383 rotatably couples the second counterbalance mechanism 382 to the second hub assembly 384 such that a longitudinal axis of the pin 383 is collinear with the eighth axis 508. In some embodiments, the second hub assembly 384 defines a slot 385 for receiving a distal end of the pin 383 so as to allow the eighth axis 508 to be moved relative to the first axis 501. In some embodiments, the slot 385 and the pin 383 are configured so as to allow the eighth axis 508 to be moved into alignment with the first axis 501 such that the first 501 and eighth 508 axes are collinear. In this way, the second counterbalance assembly 380 is capable of being effectively disconnected from the arm assembly 100 without physically disconnecting the second counterbalance assembly 380 from the arm assembly 100.

In some embodiments, the second adjustment assembly 386 includes a threaded bolt that extends into the slot 385 of the second hub assembly 384. In some such embodiments, the distal end of the pin 383 defines threads that are configured to engage with the threaded bolt of second adjustment assembly 386, thereby allowing the pin 383 to be moved within the slot 385 by rotating the threaded bolt of the second adjustment assembly 386.

Some embodiments of the present invention include a brake assembly 360 associated with the first axle 132. In some such embodiments, the brake assembly 360 is configured to selectively balance the various resultant moments associated with the first axle 132. In this way, the brake assembly 360 is capable of preventing or inhibiting the first axle 132 from rotating, thereby securing the upper arm 140 in a particular configuration.

In some embodiments, the brake assembly 360 includes a pin 362 that is configured to interface with the base 310 and/or the first support block 330. In some such embodiments, the brake assembly 360 includes one or more feature, such as threads, for securing the pin 362 relative to the base 310 and/or the first support block 330. In some embodiments, the brake assembly 360 includes a plunger 364 that is configured to slide longitudinally relative to a longitudinal axis of the pin 362 such that the brake assembly 360 is moveable between a retracted configuration and a deployed configuration. In some such embodiments, the brake assembly 360 includes one or more feature, such as a screw or bolt, for moving the plunger 364 between the retracted and deployed configurations and/or for retaining the plunger 364 in the retracted configuration, the deployed configuration, and/or somewhere there between.

In some embodiments, the brake assembly 360 is oriented such that the longitudinal axis of the pin 362 is substantially parallel with, but offset from, the longitudinal axis of the first axle 132. In some such embodiments, a distal end of the plunger 364 is configured to interface with a side of the first hub assembly 374 so as to prevent or otherwise inhibit the first hub assembly 374 from rotating. In some embodiments, the brake assembly 360 is oriented such that the longitudinal axis of the pin 362 is substantially perpendicular to the longitudinal axis of the first axle 132. In some such embodiments, a distal end of the plunger 364 is configured to interface with an outer radius of the first hub assembly 374 so as to prevent or otherwise inhibit the first hub assembly 374 from rotating. In some embodiments, one or more mechanism, such as a spring washer, is positioned between the plunger 364 and one or more other feature of the brake assembly 360, such as a knob of the brake assembly, so as to provide adjustability in the force applied to the plunger 364. In this way, a range of normal forces can be generated between a distal end of the plunger 364 and an outer surface of the first hub assembly 374, thereby creating an adjustable friction brake.

Some embodiments of the present invention include a brake assembly 360 associated with the second axle 134. In some such embodiments, the brake assembly is configured to selectively balance the various resultant moments associated with the second axle 134. In this way, the brake assembly 360 is capable of preventing or inhibiting the second axle 134 from rotating, thereby securing the forearm 160 in a particular configuration.

In some embodiments, the brake assembly 360 includes a pin 362 that is configured to interface with the base 310 and/or the second support block 340. In some such embodiments, the brake assembly 360 includes one or more feature, such as threads, for securing the pin 362 relative to the base 310 and/or the second support block 340. In some embodiments, the brake assembly 360 includes a plunger 364 that is configured to slide longitudinally relative to a longitudinal axis of the pin 362 such that the brake assembly 360 is moveable between a retracted configuration and a deployed configuration. In some such embodiments, the brake assembly 360 includes one or more feature, such as a screw or bolt, for moving the plunger 364 between the retracted and deployed configurations and/or for retaining the plunger 364 in the retracted configuration, the deployed configuration, and/or somewhere there between.

In some embodiments, the brake assembly 360 is oriented such that the longitudinal axis of the pin 362 is substantially parallel with, but offset from, the longitudinal axis of the second axle 134. In some such embodiments, a distal end of the plunger 364 is configured to interface with a side of the second hub assembly 384 so as to prevent or otherwise inhibit the second hub assembly 384 from rotating. In some embodiments, the brake assembly 360 is oriented such that the longitudinal axis of the pin 362 is substantially perpendicular to the longitudinal axis of the second axle 134. In some such embodiments, a distal end of the plunger 364 is configured to interface with an outer radius of the second hub assembly 384 so as to prevent or otherwise inhibit the second hub assembly 384 from rotating. In some embodiments, one or more mechanism, such as a spring washer, is positioned between the plunger 364 and one or more other feature of the brake assembly 360, such as a knob of the brake assembly 360, so as to provide adjustability in the force applied to the plunger 364. In this way, a range of normal forces can be generated between a distal end of the plunger 364 and an outer surface of the second hub assembly 384, thereby creating an adjustable friction brake.

The present invention further includes a hand assembly 200. In some embodiments, the hand assembly 200 is configured to hold an object 20 and to allow for rotation of the object 20. In some such embodiments, the hand includes one or more feature for holding the object 20 such that the object 20 rotates about its center of gravity.

In some embodiments, the hand assembly 200 includes a boom arm 220 for supporting a carriage assembly 250 of the hand assembly, the carriage assembly being configured to engage with the object 20. In some embodiments, a proximal end 222 of the boom arm 220 is coupled to the forearm 160 of the arm assembly 100 and a distal end 224 of the boom arm 220 is coupled to the carriage assembly 250.

In some embodiments, the proximal end 222 of the boom arm 220 is rotatably coupled to the distal end of the forearm 160, thereby defining a wrist joint 210. In some embodiments, the wrist joint 210 is configured to allow for rolling the hand assembly relative to the wrist joint, thereby allowing for rolling of an object 20 supported by the hand assembly.

In some embodiments, the carriage assembly 250 is rotatably coupled to the distal end 224 of the boom arm 220, thereby defining a first hand joint 230. In some embodiments, the first hand joint 230 is configured to allow for yawing the carriage assembly 250, thereby allowing for yawing of an object 20 supported by the carriage assembly 250. In some embodiments, the first hand joint 230 is configured to allow the arm assembly 100 and/or the hand assembly 200 to be reconfigured, repositioned, and/or reoriented while maintaining the yaw of the object 20.

In some embodiments, the carriage assembly 250 of the hand assembly 200 includes an outer carriage support 252 and an inner carriage support 254 coupled thereto. In some such embodiments, the outer carriage support 252 is coupled to the distal end 224 of the boom arm 220 by way of the first hand joint 230 such that the outer carriage support 252 is capable of being rotated relative to the boom arm 220.

In some embodiments, the inner carriage support 254 is rotatably coupled to the outer carriage support 252, thereby defining one or more second hand joint 240. In some such embodiments, the one or more second hand joint 240 is allow for change in the pitch of an object supported by the inner carriage support 254. In some embodiments, the second hand joint 240 is configured to allow the arm assembly 100 and/or the hand assembly 200 to be reconfigured, repositioned, and/or reoriented while maintaining the pitch of the object 20.

In various embodiments of the present invention, one or more locking mechanism is utilized to prevent or otherwise inhibit one or more joint of the hand assembly 200, including the wrist joint 210, the first hand joint 230, and/or one or more second hand joint 240, from rotating, thereby securing the hand assembly 200 and/or the carriage assembly 250 in a particular configuration. In this way, the hand assembly 200 and/or the carriage assembly 250 can be reconfigured so as to more closely position a center of gravity of an object supported by the hand assembly and/or the carriage assembly with a center of rotation of the hand assembly 200 and/or the carriage assembly 250.

In some embodiments, the carriage assembly 250 includes an adjustment assembly 260 for selectively adjusting the location of the axis of rotation of the inner carriage support 254 relative to the hand assembly 200 (i.e. the fifth axis 505), thereby adjusting the location of the center of gravity of the combined mass of the inner carriage support 254 and the object 20. In some embodiments, the adjustment assembly 260 includes a trolley 265 slidably engaged with the outer carriage support 252 such that the trolley 265 is moveable between a first position and a second position relative to the outer carriage support 252.

In some embodiments, the adjustment assembly 260 includes one or more locking feature for selectively securing the trolley 265 at the first position, the second position, or a plurality of intermediate positions. In some embodiments, the locking feature includes first 262 and second 264 sleeves positioned on either side of the trolley 265, each being configured to selectively prevent the trolley 265 from sliding in respective first and second directions. In some embodiments, the first 262 and second 264 sleeves each define internal threads that are configured to engage with respective first and second threaded regions of the outer carriage support 252, thereby providing adjustable positioning of the first 262 and second 264 sleeves. In some embodiments, the first threaded region extends into the second threaded region, thereby providing additional positional versatility. In some embodiments, the trolley can be selectively locked into position by biasing each of the first 262 and second 264 sleeves towards each other with the trolley 265 positioned in-between. In this way, the first 262 and second 264 sleeves operate as "jam-nuts" for securing the trolley 265 in place. In some such embodiments, the trolley 265 defines opposed flat regions for selective engagement with the first 262 and second 264 sleeves.

In some embodiments, the first sleeve 262 defines a first surface for interfacing with the trolley 265 and an opposed second surface for interfacing with the outer carriage support 252. In some such embodiments, the second surface is configured to prevent the first sleeve 262 from moving beyond a first position relative to the outer carriage support 252, thereby preventing the trolley 265 from moving beyond its first position. In some embodiments, the first sleeve 262 includes a continuous wall extending away from the trolley 265 so as to provide a sheath over at least a portion of the threaded region of the outer carriage support 252 as the first sleeve 262 is moved away from its first position.

In some embodiments, the second sleeve 264 defines a first surface for interfacing with the trolley 265 and one or more feature, such as a second surface opposed to the first surface, for interfacing with a stop 266 of the adjustment assembly 260. In some embodiments, the stop 266 is configured to prevent the second sleeve 264 from moving beyond a first position relative to the outer carriage support 252, thereby preventing the trolley 265 from moving beyond its second position. In some embodiments, the stop 266 includes a lip and/or other feature that is configured to prevent the second sleeve from moving beyond a certain point. In some embodiments, the lip is defined by a washer secured to a distal end of the outer carriage support 252, the washer having an outer diameter that is larger than an outer diameter of such distal end. In some embodiments, the second sleeve 264 includes a continuous wall extending away from the trolley 265 so as to provide a sheath over at least a portion of the distal end of the outer carriage support 250 as the second sleeve 262 is moved away from the stop 266.

In some embodiments, the inner carriage support 254 is rotatably coupled to the trolley 265 of the adjustment assembly 260 such that moving the trolley 265 between its first and second positions affects the location and/or orientation of the fifth axis 505. In some embodiments, the hand assembly 200 includes two adjustment assemblies 260 that are independently adjustable such that adjustment of one affects the orientation of the fifth axis 505 while simultaneous adjustment of each affects the position of the fifth axis 505. In this way, the center of gravity of the combined mass of the hand assembly 200 and the object 200 can be aligned with the axis of rotation of the hand assembly (i.e. axis 503).

The present invention also includes a method of supporting an object 20. Some methods include the step of securing the object to an inner carriage support 254 of a carriage assembly 250 of a hand assembly 200 such that a center of gravity of the combined mass of the inner carriage support 254 and the object 20 is aligned with the fifth axis 505. Some methods further include the step of adjusting the position and/or orientation of the inner carriage support 254 relative to an outer carriage support 252 of the carriage assembly 250 and/or adjusting the position and/or orientation of the carriage assembly 250 relative to a boom arm 220 of the hand assembly 200 such that a center of gravity of the combined mass of the hand assembly 200 and the object 20 is aligned with the third axis 503. In some embodiments, depending on the mass and mass distribution of the object 20, the inner carriage support 254, and/or the hand assembly 200, aligning the third 503 and fifth 505 axes with respective centers of gravity will cause the third axis 503 to intersect the fifth axis 505 and/or will cause the fifth axis 505 to be perpendicular to the third axis 503. In some embodiments, the third axis 503 does not intersect the fifth axis 505 and/or the fifth axis 505 is not perpendicular to the third axis 503.

In some embodiments, adjusting the position and/or orientation of the inner carriage support 254 relative to the outer carriage support 252 is accomplished by adjusting one or more adjustment assembly 260 of the hand assembly 260. In some embodiments, the adjustment assembly 260 is moved to a locked configuration upon completion of such adjustment, thereby preventing additional and/or inadvertent adjustment.

In some embodiments, adjusting the position and/or orientation of the carriage assembly 250 relative to the boom arm 220 is accomplished by rotating the carriage assembly about an axis of rotation of the carriage assembly (i.e. the fourth axis 504). In some embodiments, rotating the carriage assembly about the fourth axis 504 is accomplished while a first hand joint 230 of the hand assembly 200 is in a released or free configuration. In some embodiments, the first hand joint 230 is moved to a locked configuration upon completion of such adjustment, thereby preventing additional and/or inadvertent adjustment.

In some embodiments, the hand assembly 200 is supported by an arm assembly 100 having an upper arm 140 and a forearm 160, the forearm 160 being supported by a distal end of the upper arm 140 and the hand assembly 200 being supported by a distal end of the forearm 140. In some embodiments, the method of supporting an object 20 includes generating one or more biasing load for supporting the hand assembly 200. In some embodiments, a first counterbalance assembly 370 is used to generate a first biasing load for supporting the upper arm in a first orientation and/or a second counterbalance assembly 380 is used to generate a second biasing load for supporting the forearm 160 in a first orientation relative to the upper arm 140. In some embodiments, each of the first and/or second biasing loads is generated at or adjacent to a proximal end 142 of the upper arm 140. In some embodiments, a drive assembly 190 is utilized to transfer the second biasing load to the forearm 160.

The present invention further includes a method of repositioning an object. In some embodiments, the method includes moving the upper arm 140 and/or the forearm 140 from its respective first orientation to a respective second orientation, thereby causing the arm assembly 100 to move from a first configuration to a second configuration. In some embodiments, a wrist joint 210 of the hand assembly 200 allows the hand assembly 200 to rotate relative to the arm assembly 100 and a second hand joint 240 of the carriage assembly 250 allows the inner carriage support 254 to rotate relative to the outer carriage support 252 such that the center of gravity of the combined mass of the hand assembly 200 and the object 200 remains aligned with the third axis 503 while the arm assembly 100 is moved from its first configuration to its second configuration.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A support system for holding and repositioning an object, the support system comprising:
    an arm assembly;
    a hand assembly coupled to said arm assembly, said hand assembly being configured to selectively engage with the object; and
    a drive assembly extending from the elbow assembly towards the shoulder assembly, the drive assembly being configured to cause the forearm to move between its retracted and extended configurations,
    wherein said arm assembly comprises a shoulder assembly, an elbow assembly, and an upper arm extending therebetween, said upper arm being moveable between a lowered configuration and a raised configuration by rotating the upper arm about a first axis, the first axis being associated with the shoulder assembly, thereby causing the elbow assembly to move along an arc about the first axis,
    wherein said arm assembly further comprises a forearm extending from said elbow assembly, said forearm being moveable between a retracted configuration and an extended configuration by rotating the forearm about a second axis, the second axis being associated with the elbow assembly, thereby causing a distal end of the forearm to move along an arc about the second axis,
    wherein said hand assembly is coupled to said distal end of said forearm,
    wherein said drive assembly comprises (a) a first gear associated with the shoulder assembly, (b) a second gear associated with the elbow assembly, and (c) a linkage member extending between the first and second gears, said first and second gears being configured to rotate about respective first and second axes such that rotation of the first gear about the first axis causes the second gear to rotate about the second axis, thereby causing the forearm to move between its retracted and extended configurations, the rotation of the first gear being independent of rotation of the upper arm, and
    wherein the shoulder assembly comprises first and second axles, each being configured to rotate about the first axis independent of the other axle, said first axle being coupled to said upper arm such that rotation of the first axle causes the upper arm to rotate and said second axle being coupled to said first gear such that rotation of said second axle causes said forearm to rotate.

2. The support system of claim 1, further comprising a first counterbalance assembly comprising a hub assembly coupled to said first axle and a telescoping member rotatably coupled to said hub assembly such that said first counterbalance assembly functions as a cam for biasing said upper arm towards its raised configuration.

3. The support system of claim 2, further comprising a second counterbalance assembly comprising a hub assembly coupled to said second axle and a telescoping member rotatably coupled to said hub assembly such that said second counterbalance assembly functions as a cam for biasing said forearm towards its retracted or extended configuration.

4. The support system of claim 3, wherein said hand assembly is rotatably coupled to said distal end of said forearm such that said hand assembly is capable of rotating about a third axis, the third axis being generally perpendicular to the second axis.

5. The support system of claim 4, wherein said hand assembly comprises a carriage assembly and a boom arm extending from said arm assembly to said carriage assembly, said carriage assembly being rotatably coupled to said boom arm such that said carriage assembly is capable of rotating about a fourth axis, said fourth axis being generally perpendicular to said third axis.

6. The support system of claim 5, wherein said carriage assembly comprises an outer carriage support extending from said boom arm and an inner carriage support rotatably coupled to said outer carriage support such that said inner carriage support is capable of rotating about a fifth axis, said fifth axis being generally perpendicular to said fourth axis, said inner carriage support being configured to engage with the object.

7. The support system of claim 1, wherein said hand assembly is rotatably coupled to said distal end of said forearm such that said hand assembly is capable of rotating about a third axis, the third axis being generally perpendicular to the second axis.

8. The support system of claim 7, wherein said hand assembly comprises a carriage assembly and a boom arm extending from said arm assembly to said carriage assembly, said carriage assembly being rotatably coupled to said boom arm such that said carriage assembly is capable of rotating about a fourth axis, said fourth axis being generally perpendicular to said third axis.

9. The support system of claim 8, wherein said carriage assembly comprises an outer carriage support extending from said boom arm and an inner carriage support rotatably coupled to said outer carriage support such that said inner carriage support is capable of rotating about a fifth axis, said fifth axis being generally perpendicular to said fourth axis, said inner carriage support being configured to secure to the object.

10. A method of supporting an object, the method comprising:
    generating a first biasing load adjacent to a proximal end of an upper arm of an arm assembly;
    transferring the first biasing load to the upper arm so as to bias the upper arm towards one of a lowered or raised configuration;
    generating a second biasing load adjacent to the proximal end of the upper arm; and
    transferring the second biasing load to a distal end of the upper arm so as to bias a forearm of the arm assembly towards one of a retracted or extended configuration,
    wherein the object is secured to a hand assembly extending from a distal end of the forearm,
    wherein the steps of generating and transferring the first biasing load are independent of the steps of generating and transferring the second biasing load, and
    wherein the steps of generating the first and second biasing loads comprise biasing telescoping members of respective first and second counterbalance assemblies towards a respective contracted or extended configuration, the telescoping members being rotatably coupled to respective hub assemblies such that said first and second counterbalance assemblies function as cams rotating about a first axis.

11. The method of claim 10, wherein the step of transferring the second biasing load comprises:
    transferring the biasing load to a first gear of a drive assembly, the first gear being configured to rotate about the first axis;
    transferring the biasing load from the first gear to an elongate member extending between the first gear and a second gear of the drive assembly, the second gear being configured to rotate about a second axis,
    wherein the distal end of the forearm is configured to move along an arc about the second axis as the second gear is rotated about the second axis.

* * * * *